(12) United States Patent
Carapelli

(10) Patent No.: US 10,102,401 B2
(45) Date of Patent: Oct. 16, 2018

(54) FUEL DISPENSER USER INTERFACE SYSTEM ARCHITECTURE

(71) Applicant: GILBARCO S.r.l., Florence (IT)

(72) Inventor: Giovanni Carapelli, Florence (IT)

(73) Assignee: Gilbarco Inc., Greensboro, NC (US)

( * ) Notice: Subject to any disclaimer, the term of this patent is extended or adjusted under 35 U.S.C. 154(b) by 1063 days.

(21) Appl. No.: 13/655,938

(22) Filed: Oct. 19, 2012

(65) Prior Publication Data

US 2013/0103190 A1 Apr. 25, 2013

Related U.S. Application Data

(60) Provisional application No. 61/660,642, filed on Jun. 15, 2012, provisional application No. 61/549,609, filed on Oct. 20, 2011.

(51) Int. Cl.
*G06Q 40/00* (2012.01)
*G06F 21/82* (2013.01)
(Continued)

(52) U.S. Cl.
CPC ............ *G06F 21/82* (2013.01); *G06F 21/445* (2013.01); *G06F 21/86* (2013.01); *G07F 7/1033* (2013.01); *G07F 9/006* (2013.01); *G07F 9/026* (2013.01)

(58) Field of Classification Search
CPC ........ G06Q 10/00; G06Q 40/00; G06Q 20/00; G06Q 30/00; G06F 21/82; G07F 7/1033
(Continued)

(56) References Cited

U.S. PATENT DOCUMENTS 4,200,770 A 4/1980 Hellman et al.
4,405,829 A 9/1983 Rivest et al.
(Continued)

FOREIGN PATENT DOCUMENTS

| CN | 101611379 A | 12/2009 |
| EP | 1408459 A1 | 4/2004 |
| WO | 2010142748 A1 | 12/2010 |

OTHER PUBLICATIONS

International Searching Authority, "Notification of Transmittal of the International Search Report and the Written Opinion of the international Searching Authority, or the Declaration," Issued in International Application No. PCT/EP2012/070841, dated Feb. 12, 2013, dated Feb. 21, 2013.

(Continued)

*Primary Examiner* — Frantzy Poinvil
(74) *Attorney, Agent, or Firm* — Nelson Mullins Riley & Scarborough, LLP

(57) ABSTRACT

A vending machine user interface can include a first controller operatively connected to an input device capable of receiving payment or account information. The first controller can, with another device, via a second controller, or otherwise, allow secure communication of data from the input device. The first controller, in this regard, can control the communication between the input device and the other device to protect the input device from unwarranted communication from the other device. The first controller can establish a secure channel with the other device using encrypted communications. The first controller, second controller, etc. can be connected to independent printed circuit boards (PCB). Activation of sensors connected to the PCBs can cause the first and/or second controllers to erase data necessary to ascertain/decode communications from the input device, such as encryption/decryption information, or (Continued)

may otherwise decommission the input device or a portion thereof.

7 Claims, 13 Drawing Sheets

(51) Int. Cl.
| | | |
|---|---|---|
| G07F 7/10 | (2006.01) | |
| G07F 9/00 | (2006.01) | |
| G07F 9/02 | (2006.01) | |
| G06F 21/44 | (2013.01) | |
| G06F 21/86 | (2013.01) | |

(58) Field of Classification Search
USPC .................. 705/3–44, 50; 235/383; 713/168
See application file for complete search history.

(56) References Cited

U.S. PATENT DOCUMENTS

| | | | |
|---|---|---|---|
| 4,797,920 A | 1/1989 | Stein | |
| 5,228,084 A | 7/1993 | Johnson et al. | |
| 5,493,613 A | 2/1996 | Denno et al. | |
| 5,790,410 A | 8/1998 | Warn et al. | |
| 5,832,206 A | 11/1998 | DeJesus et al. | |
| 6,026,492 A | 2/2000 | Cromer et al. | |
| 6,115,819 A | 9/2000 | Anderson | |
| 6,185,307 B1 | 2/2001 | Johnson, Jr. | |
| 6,317,835 B1 | 11/2001 | Bilger et al. | |
| 6,360,138 B1 | 3/2002 | Coppola et al. | |
| 6,442,448 B1 | 8/2002 | Finley | |
| 6,577,734 B1 | 6/2003 | Etzel et al. | |
| 6,630,928 B1 | 10/2003 | McIntyre et al. | |
| 6,669,100 B1 | 12/2003 | Rogers et al. | |
| 6,736,313 B1 | 5/2004 | Dickson | |
| 6,789,733 B2 | 9/2004 | Terranova et al. | |
| 7,047,223 B2 | 5/2006 | Watlington | |
| 7,054,829 B2 | 5/2006 | Campo et al. | |
| 7,215,775 B2 | 5/2007 | Noguchi et al. | |
| 7,248,719 B2 | 7/2007 | Hoffman et al. | |
| 7,254,463 B1 * | 8/2007 | Moore | B67D 7/04 222/14 |
| 7,370,200 B2 | 5/2008 | Kindberg et al. | |
| 7,607,576 B2 | 10/2009 | Robertson et al. | |
| 7,699,757 B2 * | 4/2010 | Clem | A63B 21/0004 482/121 |
| 7,953,968 B2 | 5/2011 | Robertson et al. | |
| 8,009,832 B2 | 8/2011 | Suh et al. | |
| 8,195,328 B2 * | 6/2012 | Mallett | A61L 11/00 221/102 |
| 8,392,846 B2 | 3/2013 | Carapelli | |
| 8,558,685 B2 | 10/2013 | Long et al. | |
| 9,268,930 B2 | 2/2016 | Williams et al. | |
| 2002/0026575 A1 | 2/2002 | Wheeler et al. | |
| 2002/0066020 A1 | 5/2002 | Whytock | |
| 2002/0124170 A1 | 9/2002 | Johnson, Jr. | |
| 2002/0136214 A1 * | 9/2002 | Do | G06Q 20/4014 370/392 |
| 2002/0138554 A1 | 9/2002 | Feigen et al. | |
| 2002/0153424 A1 | 10/2002 | Li | |
| 2002/0157003 A1 | 10/2002 | Beletski | |
| 2002/0174067 A1 | 11/2002 | Hoffman et al. | |
| 2002/0191029 A1 | 12/2002 | Gillespie et al. | |
| 2003/0002667 A1 | 1/2003 | Gougeon et al. | |
| 2003/0030720 A1 | 2/2003 | Hutchings | |
| 2003/0055738 A1 | 3/2003 | Alie | |
| 2003/0194071 A1 | 10/2003 | Ramian | |
| 2004/0172339 A1 | 9/2004 | Snelrove et al. | |
| 2005/0145690 A1 | 7/2005 | Shibasaki | |
| 2005/0211766 A1 | 9/2005 | Robertson et al. | |
| 2005/0278533 A1 | 12/2005 | Mayer | |
| 2006/0089145 A1 | 4/2006 | Chen et al. | |
| 2007/0033398 A1 | 2/2007 | Robertson et al. | |
| 2007/0204173 A1 | 8/2007 | Kuhn | |
| 2008/0120191 A1 | 5/2008 | Long | |
| 2009/0154696 A1 | 6/2009 | Robertson et al. | |
| 2009/0265638 A1 * | 10/2009 | Carapelli | G06F 15/173 715/741 |
| 2010/0020971 A1 | 1/2010 | Hanks et al. | |
| 2010/0230437 A1 | 9/2010 | Carapelli | |
| 2010/0258624 A1 | 10/2010 | Nochi | |
| 2010/0268612 A1 | 10/2010 | Berrio et al. | |
| 2011/0047081 A1 | 2/2011 | Kelly et al. | |
| 2011/0099279 A1 | 4/2011 | Hooper et al. | |
| 2011/0134044 A1 | 6/2011 | Carapelli | |
| 2011/0185319 A1 | 7/2011 | Carapelli | |
| 2011/0199308 A1 | 8/2011 | Nativel et al. | |
| 2011/0231648 A1 | 9/2011 | Robertson et al. | |
| 2011/0238511 A1 | 9/2011 | Park et al. | |
| 2012/0059694 A1 | 3/2012 | Kuebert et al. | |
| 2012/0166343 A1 | 6/2012 | Carapelli et al. | |
| 2012/0286760 A1 | 11/2012 | Carapelli et al. | |
| 2013/0103190 A1 * | 4/2013 | Carapelli | G06F 21/82 700/237 |
| 2013/0300453 A1 | 11/2013 | Carapelli et al. | |
| 2014/0358705 A1 * | 12/2014 | Harrington | G06Q 20/322 705/16 |

OTHER PUBLICATIONS

Extended European Search Report dated Mar. 31, 2016 in European patent application No. 13858254.9.
International Search Report and Written Opinion dated May 14, 2014 in international application No. PCT/US2013/071897.
"Smart Connect" Product Brochure by Gilbarco Veeder-Root, copyright 2004 Gilbarco Inc.
"Payment Card Industry ("PCI") PIN Entry Device Testing and Approval Program Guide", Version 4.0, Sep. 2004, Visa Public.
"Payment Card Industry ("PCI") PIN Entry Device Testing and Approval Program Guide," Version 4.0, VISA Public, Sep. 2004.
"TFT Color LCD Module: Type NL6448CC33-30W 26cm (10.4 Type), VGA," 4th ed., NEC Corporation, Jul. 13, 2000.
"Payment Card Industry ("PCI") POS PIN Entry Device Security Requirements Manual," Version 1.2, Sep. 2004.
"PCI POS PED Evaluation FAQ (Technical)," Sep. 21, 2004.
Chapter 7 of Book 4 of Version 4.1 of the Europay MasterCard Visa ("EMV") standard for Integrated Circuit Card Specifications for Payment Systems (May 2004).
Non-Final Rejection dated Aug. 11, 2016 in co-pending U.S. Appl. No. 15/049,750.
Office Action dated Apr. 19, 2016 in corresponding Chinese patent application No. 201280063412.9.
Office Action dated Sep. 22, 2017 in corresponding Chinese patent application serial No. 201280063412.9.

* cited by examiner

FUEL DISPENSER USER INTERFACE SYSTEM ARCHITECTURE

CROSS REFERENCE TO RELATED APPLICATIONS

The present application claims the benefit of U.S. patent application No. 61/549,609, filed Oct. 20, 2011, and entitled "Fuel Dispenser User Interface System Architecture," and U.S. patent application No. 61/660,642, filed Jun. 15, 2012, and entitled "Fuel Dispenser User Interface System Architecture," the disclosures of which are hereby incorporated by reference as if set forth verbatim herein in their entireties and relied upon for all purposes.

TECHNICAL FIELD

The subject matter described herein relates generally to fuel dispensers, and more specifically to user interfaces employed by fuel dispensers.

BACKGROUND

Fuel dispensers typically include a controller configured to handle sensitive payment information received from a user to effect payment for fuel dispensed to the user. The sensitive payment information is usually provided to the fuel dispenser via one or more components, such as a card reader and a PIN pad. Any sensitive payment information received by the PIN pad is generally encrypted and forwarded to the controller regardless of whether the PIN pad uses a separate controller. Because the controller is configured to handle the sensitive payment information, it is usually subject to certain security requirements imposed on devices that handle such information, which may include a certification process. Any changes to the design of the controller typically require recertification, which can be a relatively protracted and expensive process. This process may also impact other functions of the fuel dispensers supported by the controller.

SUMMARY

The following presents a simplified summary of one or more aspects of the subject matter disclosed herein to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Various aspects described herein relate to filtering data to/from components of a fuel dispenser (or other vending machine) to ensure secure operation of at least some of the components using one or more controllers that allow for replacing at least some of the components without requiring recertification. For example, an input device, such as a personal identification number (PIN) pad for entering a PIN, can process at least some functions independent of a display at the fuel dispenser. In certain configurations, the PIN pad can be physically separated from the display, operating using a different controller, printed circuit board, etc., than the display, while providing information to the display, or even controlling the display, via a communications medium, etc. In this regard, the PIN pad can secure operations, such as obtaining and communicating a received PIN, from the other components of the fuel dispenser, and/or can secure the display. This can prevent tampering with or otherwise compromising received PIN or other confidential information. In addition, using the PIN pad to control the display can facilitate use of more modular displays, which lends to replacement of the display without requiring recertification.

In another example, a virtual PIN pad can be rendered by the display where the display has touchscreen functionality, and thus a secure controller can secure the display while the PIN pad is activated thereon to prevent unauthorized access. For example, the secure controller can block data from certain applications while another application is using the display for PIN pad functionality. In addition, for example, mechanisms can be provided to determine whether to authenticate applications to use such functionality based on one or more considerations of the applications. For example, where the application is signed by an authenticated source, access to the display (or at least the touchscreen functionality thereof, more regions of the touchscreen, etc.) can be provided, while access of the display can be limited for applications that are not authenticated. Using the virtual PIN pad can mitigate the need for a physical PIN pad, and thus recertification may not be required for the display upon replacement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements, and in which.

DETAILED DESCRIPTION

Figure 1:
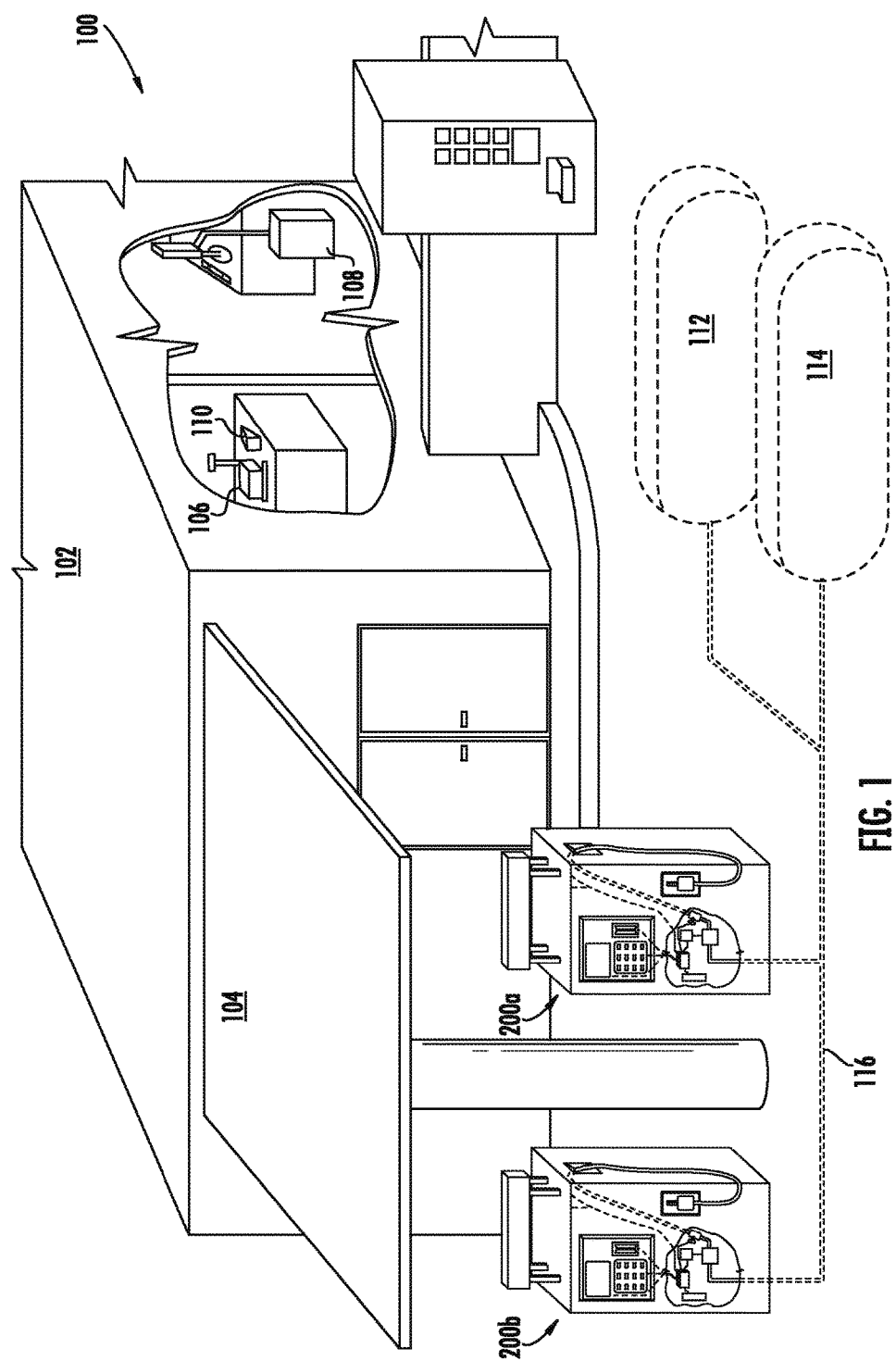
FIG. 1 is a partially schematic, perspective view of a fueling environment in accordance with aspects described herein.

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to securing components of a vending machine, such as a fuel dispenser, or at least certain functions thereof, from other components to facilitate security, tamper-proofing, etc. In some cases, this can facilitate replacement of components without requiring recertification. For example, a secure controller can be used to secure a component where the component, or another component or related function, is active. In a specific example, the fuel dispenser can include a display with touchscreen functionality, and a secure controller operatively connected to the display can manage the display such to limit access thereof where the touchscreen display is requesting personal identification number (PIN) entry via the display or a PIN entry device (PED). Limiting access can include locking the display for use only by an application accessing the display, disabling the touchscreen functionality, limiting a number of touchable regions, and/or the like. Moreover, for example, the components accessing the display can relate to one or more processors, where at least one of the processors can verify authentication of applications executing thereon by determining whether the applications are signed by an authenticated entity to provide another layer of security for accessing the display.

In another example, various components can be separated by using separate controllers to operate the components, separate printed circuit boards (PCB) to operate the components, etc. In other examples, a component to be secured can have sole access to another component, such to ensure the accessed component cannot be used to infiltrate the secured component. In this example, the secured component can include a secure controller for providing security thereto, and can use the secure controller to operate the other component in accordance with security parameters or policies defined by or for the secured component.

In one specific example, a PIN pad in a fuel dispenser can operate separately from a display such to secure PIN pad communications of confidential PIN information received during a transaction. Multiple configurations of the PIN pad and display, and communications therebetween, are possible to achieve security within the PIN pad. For example, the PIN pad can include a controller for various operations, including obtaining information as an input interface (e.g., obtain numbers pressed by a user), communicating secured information to other systems (e.g., a transaction processing system), communicating general information to/from other systems, etc. The controller can be a secure controller, for example, that can block access to the PIN pad when the PIN pad is activated for use with a certain application. This secure controller can operate the display as well from the PIN pad, which can allow the PIN pad to ensure the display is not used to tamper with confidential information processed by the PIN pad. In this example, the display does not need a controller, and the PIN pad can communicate with the display over a communicative medium, such as one or more cables, which can provide additional features as described herein.

In other examples, it is to be appreciated that the display can have a second controller separate from that of the PIN pad (e.g., and/or the display and PIN pad correlate to separate PCBs). In this regard, the controller for the PIN pad (or at least for sensitive functions thereof) can communicate with the display via the second controller, but can regulate whether and/or what sort of communications can be received from the second controller. In one example, the controllers can implement secure communication paths or channels to ensure another component does not compromise the communications path. For example, the controllers can use encryption, such as a digital certificate, or some sort of similar communication-based implementation. In an additional or alternative example, a hardware verification can be used, such as dismounting sensors, to detect tampering with the display, the second controller, or communications media displaced between the controllers.

Moreover, though illustrated and described as embodied in a fuel dispenser, it is to be appreciated that aspects described herein can be similarly applied to substantially any vending machine that processes transaction payment or other processes involving confidential information while maintaining the ability to execute other applications.

Certain aspects of the embodiments described herein are related to fueling environments, fuel dispensers, and user interfaces for fuel dispensers, examples of which may be found in U.S. patent application Ser. No. 12/287,688 (entitled "System and Method for Controlling Secure Content and Non-Secure Content at a Fuel Dispenser or Other Retail Device" and filed on Oct. 10, 2008), Ser. No. 12/544,995 (entitled "Secure Reports for Electronic Payment Systems," and filed on Aug. 20, 2009), Ser. No. 12/689,983 (entitled "Payment Processing System for Use in a Retail Environment Having Segmented Architecture," and filed on Jan. 19, 2010), Ser. No. 12/695,692 (entitled "Virtual PIN pad for Fuel Payment Systems," and filed on Jan. 28, 2010), Ser. No. 12/797,094 (entitled "Fuel Dispenser User Interface," and filed on Jun. 9, 2010), Ser. No. 12/975,502 (entitled "Fuel Dispensing Payment System for Secure Evaluation of Cardholder Data," and filed on Dec. 22, 2010), Ser. No. 13/041,753 (entitled "Fuel Dispenser Payment System and Method," and filed on Mar. 7, 2011), Ser. No. 13/105,557 (entitled "Fuel Dispenser Input Device Tamper Detection Arrangement," and filed on May 11, 2011), Ser. No. 13/117,793 (entitled "System and Method for Selective Encryption of Input Data During a Retail Transaction," and filed on May 27, 2011), Ser. No. 13/197,440 (entitled "Fuel Dispenser Application Framework" and filed on Aug. 3, 2011), Ser. No. 13/220,183 (entitled "Remote Display Tamper Detection Using Data Integrity Operations" and filed on Aug. 29, 2011), and Ser. No. 13/467,592 (entitled "Fuel Dispenser Input Device Tamper Detection Arrangement" and filed on May 9, 2012), U.S. Pat. No. 7,607,576 (entitled "Local Zone Security Architecture for Retail Environments" and issued on Oct. 27, 2009), and European patent application no. 1,408,459 (entitled "Secure Controller of Outdoor Payment Terminals in Compliance with EMV Specifications" and published on Apr. 14, 2004). Each of the foregoing applications and patent is hereby incorporated by reference as if set forth verbatim in its entirety herein and relied upon for all purposes.

FIG. 1 is a partially schematic, perspective view of a fueling environment 100 adapted to provide fuel and to accept payment for the dispensed fuel. Fueling environment 100 includes at least one fuel dispenser 200a and a central facility 102. Typically, one or more additional fuel dispensers, such as fuel dispenser 200b, may also be included within fueling environment 100. Fueling environment 100 may also include a canopy system 104 connected to central facility 102 that provides shelter to fuel dispensers 200a and 200b.

Central facility 102 includes a point-of-sale device (POS) 106 and a site controller 108 and may include additional computing devices, such as cashier and/or manager workstations. In the example illustrated, POS 106 includes an associated card reader and payment terminal 110. Each of POS 106 and site controller 108 may also include a display, a touchscreen, and/or other devices, such as a printer. It should be understood that the functionality of POS 106, site controller 108, and any additional computing devices within central facility 102 may be incorporated into a single computer or server. Alternatively, these computing devices may be operatively interconnected via a local area network (LAN). An example of a suitable system that may be used in conjunction with subject matter described herein combines the functions of POS 106 and site controller 108, to which multiple payment terminals 110 may be operatively connected, is the PASSPORT system offered by Gilbarco Inc. of Greensboro, N.C.

It is to be appreciated that fueling environment 100 may include a number of other components to facilitate the dispensing of fuel. In the example provided by FIG. 1, for instance, fueling environment 100 includes two underground storage tanks (USTs) 112 and 114 configured to store fuel that is available for purchase. For example, USTs 112 and 114 may be stocked with respective grades of fuel. USTs 112 and 114 are in fluid communication with an underground piping network 116 to which dispensers 200a and 200b are connected. As a result, fuel stored within USTs 112 and 114 may be delivered to the dispensers for purchase. Moreover, in one example, dispensers 200a and 200b can obtain information regarding the USTs 112 and 114 (e.g., a tank level, an environment indicator, such as temperature around the tank, etc.), and can communicate the information to the POS 106, site controller 108, or other device to allow for tank monitoring and/or notification of safety issues.

Figure 2:
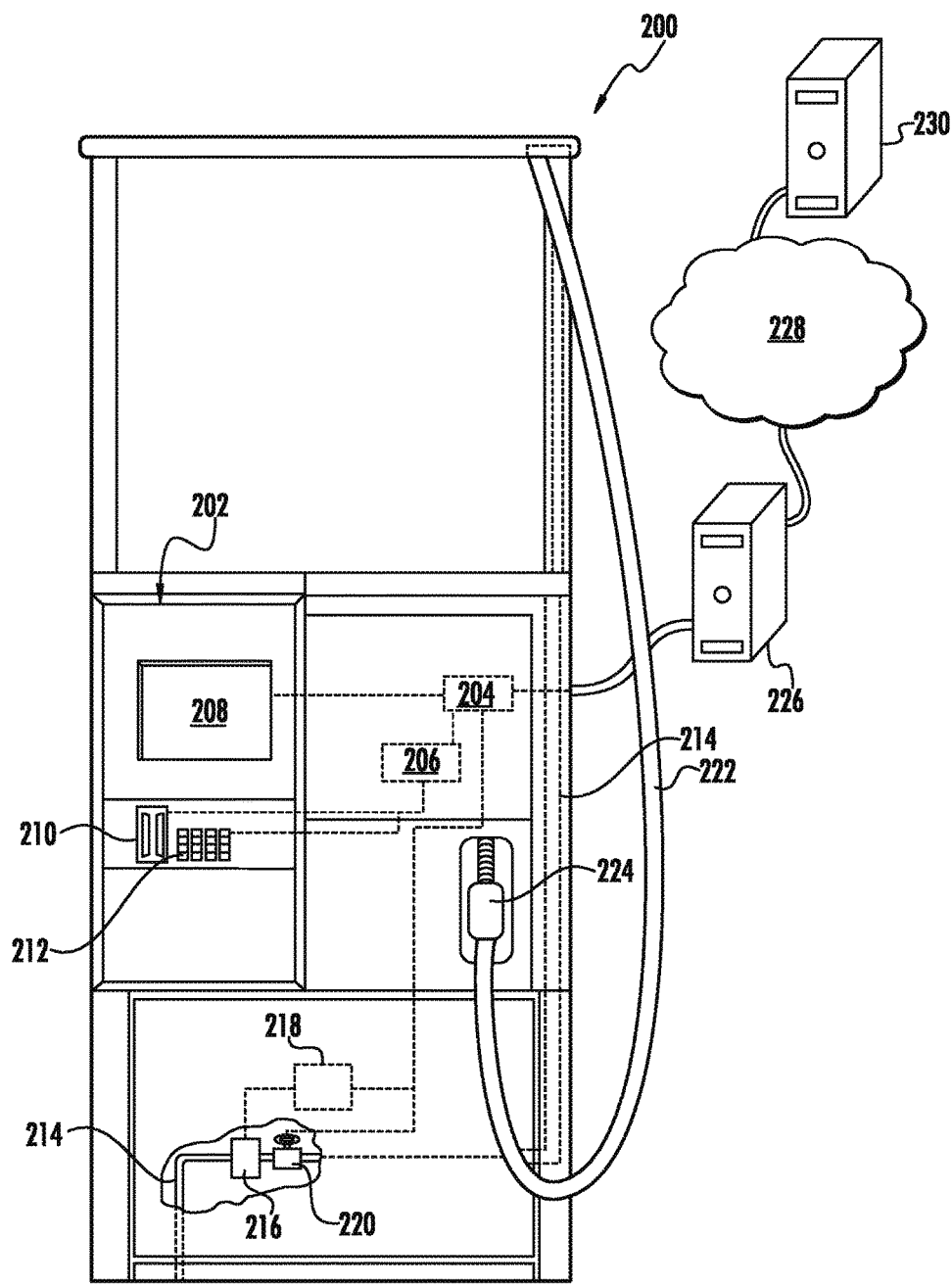
FIG. 2 is a partially schematic, front elevation view of a fuel dispenser that may be used in the fueling environment of FIG. 1 in accordance with aspects described herein.

FIG. 2 is a partially schematic, front elevation view of a fuel dispenser 200 that may be used as fuel dispensers 200a and 200b in the fueling environment of FIG. 1. Fuel dispenser 200 includes a user interface 202 that includes a first controller 204, a second controller 206, a display 208, a card reader 210, and a numeric pad 212. Controller 204 is operatively connected to controller 206 and to display 208, while controller 206 is operatively connected to controller 204 and to card reader 210 and numeric pad 212. It is to be appreciated that user interface 202 may include other components, such as a cash acceptor and/or a receipt printer, etc. Each of controllers 204 and 206 includes an Ethernet adapter and communicates with the other controller via the transmission control protocol and the Internet protocol (e.g., transmission control protocol (TCP)/internet protocol (IP), user datagram protocol (UDP), etc.), as explained below. Alternatively, controllers 204 and 206 may be connected via a universal serial bus (USB) connection and configured to communicate via the USB connection or other wired or wireless (e.g., Bluetooth, wireless local area network (WLAN), etc.) connection. In one example, one or more of the controllers 204 and 206 may be included within devices of the fuel dispenser 200, such as display 208, PIN pad 212, etc., as describer further herein, and in some examples, one or more of the controllers 204 and 206 may not be present, or maybe replaced by another controller where the remaining controller implements functionality such that the replaced controller is not needed.

For purposes of the ensuing explanation, it is to be appreciated that card reader 210 may be any device or combination of devices configured to receive data from payment cards supplied by users that contain sensitive or confidential account or payment information (referred to generally herein as sensitive information or confidential information). Card reader 210, for instance, may be a magnetic stripe card reader, a smart card reader, a contactless card reader, a radio frequency (RF) reader, or any combination thereof. Thus, the term "payment card" as used herein is intended to encompass magnetic stripe cards, smart cards, contactless cards, and RF devices, as well as other forms of cards and devices that are configured to store and provide account information. Information received from such a payment card is referred to herein as "payment data" for purposes of explanation, while the portion of the payment data sufficient to identify the account associated with the payment card is referred to as "sensitive payment data." Thus, it is to be appreciated that "payment data" as used herein may include both sensitive and non-sensitive payment information. Moreover, it is to be appreciated that "sensitive payment data" may include other confidential information, such as a PIN associated with the payment card, and is also referred to generally as "sensitive data," "confidential information," or similar terms.

In the presently-described example, card reader 210 is configured to accept payment data from various types of payment cards, including credit and debit cards, prepaid and gift cards, fleet cards, any local/private cards, etc. accepted by fueling environment 100. It should be appreciated that card reader 210 may also be configured to receive account information from non-payment and other cards, such as loyalty, frequent shopper, rewards, points, advantage, and club cards. Numeric pad 212 is also configured to receive payment data, such as the PIN associated with a payment card. For at least this reason, numeric pad 212 may be referred to in the ensuing explanation as a PIN pad (also known as a PED).

Moreover, it is to be appreciated that fuel dispenser 200 also includes various fuel dispensing components configured to facilitate the delivery of fuel to a vehicle. For instance, fuel dispenser 200 additionally includes a piping network 214, a meter 216, a pulser 218, a valve 220, a hose 222, and a nozzle 224, which can be duplicated to allow delivery of multiple fuel grades. Controller 204 is operatively connected to one or more of these components, such as pulser 218 and valve 220, to control operation thereof and/or to manage the delivery of fuel by fuel dispenser 200. Piping network 214 is in fluid communication with underground piping network 116, as described in FIG. 1, to receive fuel from the USTs. Piping network 214, hose 222, and nozzle 224 are also in fluid communication to supply the fuel to a vehicle. In other examples described herein, fuel dispenser 200 may include one of controllers 204 and 206, in which case controller 206 may operate the fuel dispensing components instead (or in addition).

User interface 202 is configured to facilitate the dispensing of fuel and the acceptance of payment for the dispensed fuel. For instance, display 208 is configured to provide instructions to a user regarding the fueling process and to display totals during and at the completion of the transaction. Display 208 can be a liquid crystal display (LCD), light emitting diode (LED) display, plasma display, etc. In addition, display 208 can be a touchscreen or a non-touchscreen display. Card reader 210 and PIN pad 212 are configured to accept payment data (e.g., as provided by the user). That is, card reader 210 can be configured to receive account information from a payment card, such as a credit or debit card. PIN pad 212 is configured to at least receive information associated with the payment card, such as a PIN of a debit card, the billing postal (zip) code of a credit card, etc. In an example, PIN pad 212 can be a physical PED, such as a number pad with hard keys, or can be a virtual PED on display 208, as described further herein. As noted above, other devices may be included within user interface 202, which may also be configured to facilitate financial transactions for the dispensed fuel. For example, a cash acceptor may be configured to handle transactions involving cash payments, while a receipt printer is configured to print a receipt upon completion of the fueling process if desired.

User interface 202 may also be configured to exchange information with a user unrelated to the fueling transaction. For instance, display 208 may be configured to provide advertisements or other information to the user, such as regarding items available for sale in the associated convenience store. PIN pad 212 (or a set of soft keys, such as those referenced below) may be configured to receive a selection from the user regarding the displayed information, such as whether the user is interested in nearby amenities. In this regard, for example, PIN pad 212 can be used in conjunction with the card reader 210 and/or display 208 to communicate data that is not as sensitive as payment information as well.

Further, a fueling environment 100 (FIG. 1) can be configured such that fuel dispenser 200 may be operatively connected to a wide area network (WAN) 228, such as the Internet. It should be understood that fuel dispenser 200 may be connected either directly to WAN 228 or indirectly via one or more additional components, such as one or more devices 226. It is to be appreciated that the additional components may include routers, switches, gateways, and other devices that participate in the LAN referenced above. In one example, devices 226 can include one or more of POS 106, site controller 108 to which the fuel dispenser is directly connected, etc. Alternatively, fuel dispenser 200 is operatively connected to POS 106 and/or site controller 108 indirectly via the LAN. An example of a suitable configuration of the fueling environment's computing devices is set forth in the Ser. No. 12/689,983 application referenced above. It should also be understood that other external resources, such as a server 230, may be operatively connected to WAN 228 and accessible to fuel dispenser 200 and/or fueling environment 100 (FIG. 1) via the WAN.

Figure 3A:
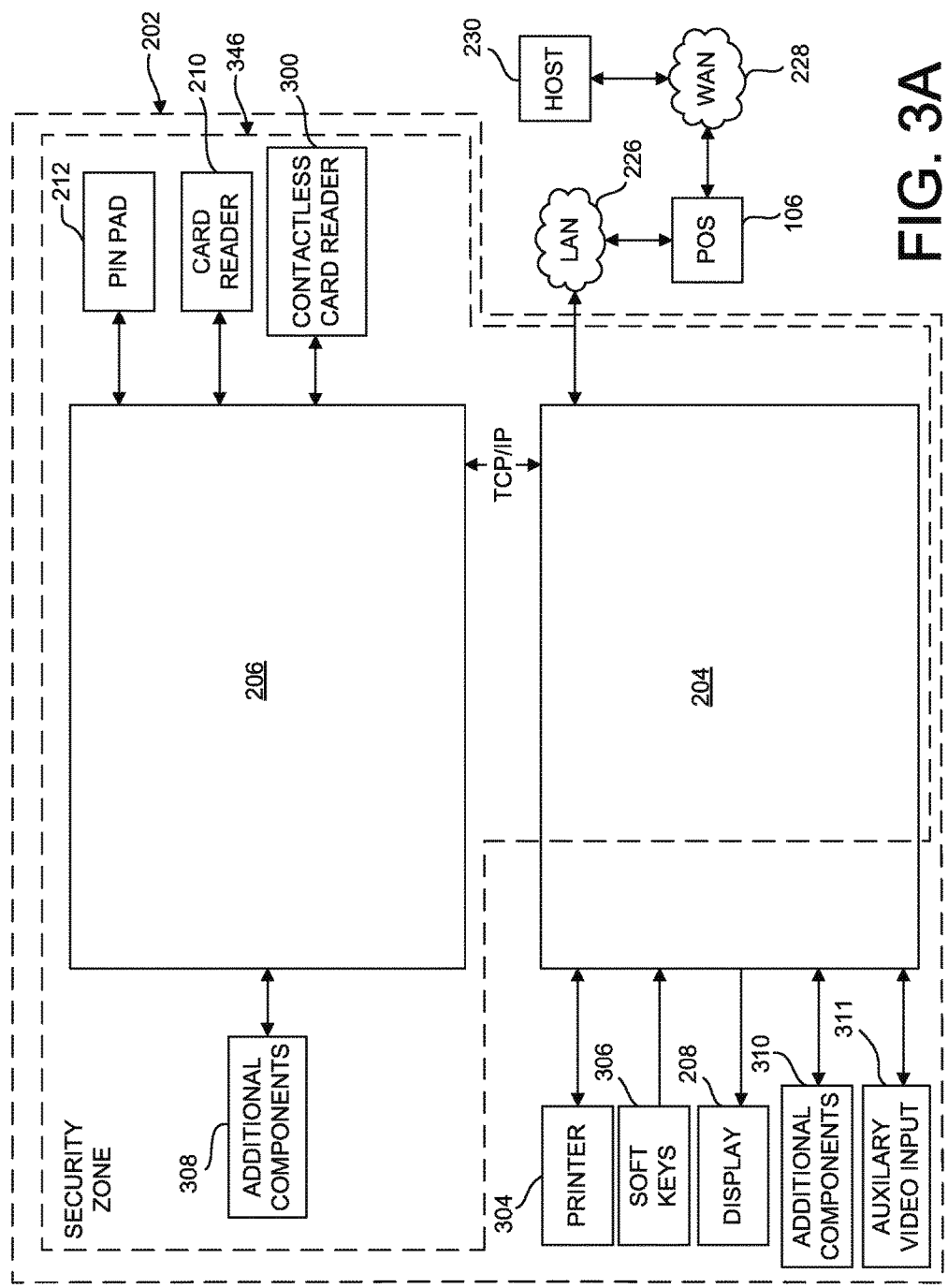
FIGS. 3A and 3B are diagrammatic representations of the components of a user interface that may be used in the fuel dispenser of FIG. 2 in accordance with aspects described herein.

FIG. 3A is a diagrammatic representation of an example user interface, such as user interface 202, comprising controllers 204 and 206, display 208, card reader 210, and PIN pad 212. In this example, user interface 202 also includes a contactless card reader 300 and additional components 308 operatively connected to controller 206, as well as a printer 304 and soft keys 306, etc. operatively connected to controller 204. User interface 202 may include additional components 310 and an auxiliary video input 311 operatively connected to controller 204. If included, auxiliary video input 311 may be configured to supply controller 204 with audio and/or video to be presented to the user from an alternative source, as explained in more detail below.

In this example, controller 204 is operatively connected to POS 106 via the LAN, which may include devices 226, as described above. Moreover, in this example, controller 204 is also operatively connected to WAN 228 indirectly via POS 106 but may alternatively be connected directly, as explained above. In the depicted example, and for purposes of the ensuing explanation, host 230 is a server of a host processing system associated with a financial institution. Separation of controllers 204 and 206, for example, allows for access control of components connected to the separate controllers. Thus, for example, there is no direct link between display 208 and PIN pad 212 without traversing controllers 204 and 206, and therefore tampering with the PIN pad 212 via display 208 is difficult or impossible, depending on policies established for communicating between the display 208 and PIN pad 212 via controllers 204 and 206. In some examples, as described further herein, controller 204 may not be needed, and display 208 can connect directly to controller 206, which manages access to the various components. Controller 206 can be part of PIN pad 212, in an example.

Figure 3B:
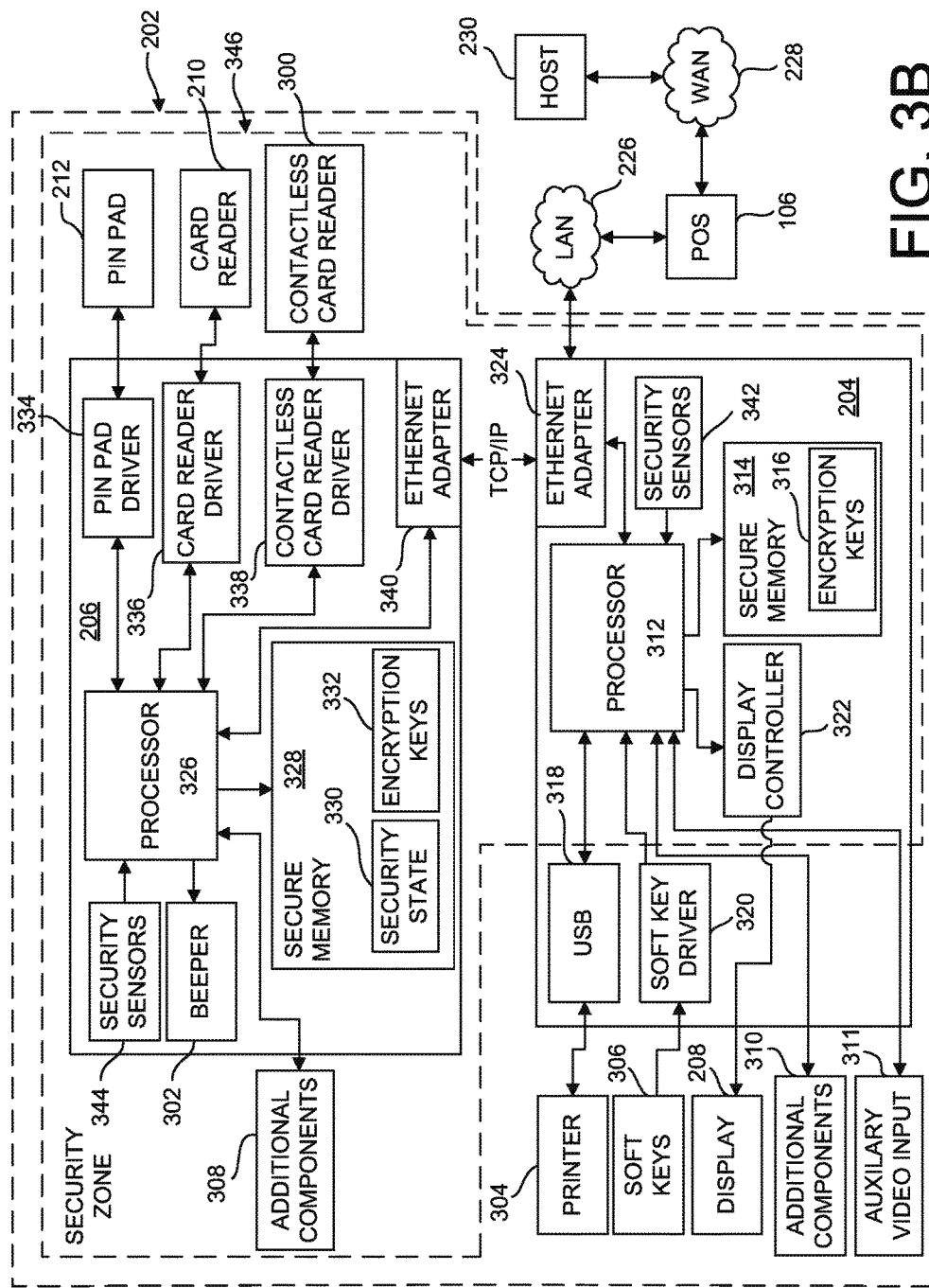

FIG. 3B is a diagrammatic representation of user interface 202 similar to FIG. 3A but additionally illustrating certain internal components of controllers 204 and 206. Controller 204 includes a processor 312 operatively connected to secure memory 314, a portion 316 of which may include encryption information. Processor 312 is operatively connected to printer 304 via a USB driver 318, to soft keys 306 via a soft key driver 320, and to display 208 via a display controller 322. Controller 204 also includes an Ethernet adapter 324 operatively connected to processor 312 and configured to communicate with controller 206 and/or with devices external to fuel dispenser 200 (FIG. 2), as explained in more detail below. Processor 312 may be operatively connected to any additional components 310 directly or indirectly via one or more drivers or communication ports. In the depicted example, additional components 310 include any component that is not configured to receive payment data, such as a cash or bill acceptor, a speaker, auxiliary displays in addition to display 208, other input/output devices, etc.

Controller 206 includes a processor 326 operatively connected to secure memory 328. In this example, secure memory 328 includes a portion 330 configured to store a security state, as well as a portion 332 configured to store encryption information. Processor 326 is configured to communicate with PIN pad 212 via a PIN pad driver 334, to card reader 210 via a card reader driver 336, and to contactless card reader 300 via a contactless card reader driver 338. Processor 326 may be operatively connected to a beeper 302, as well as to any additional components 308, the connection to which may be accomplished directly or indirectly via one or more drivers or communication ports. Drivers and ports configured to handle communication between a component and a controller should be understood in the art and are therefore not described in further detail. In this example, additional components 308 include any component capable of receiving payment data or other confidential information, such as a smart card reader.

Controller 206 also includes an Ethernet adapter 340 operatively connected to processor 326 and configured to communicate with Ethernet adapter 324, as explained in more detail below. Ethernet adapter 324 can also effect connection between controller 204 and devices 226 in this example. Each of controllers 204 and 206, in this example, includes a set of security sensors 342 and 344, respectively, operatively connected to the processor of the respective controller. The function and operation of security sensors 342 and 344 are explained in more detail below.

Each of processors 312 and 326 may be a processor, microprocessor, controller, microcontroller, other appropriate circuitry, or any combination thereof. Each of memories 314 and 328 may be any suitable type of memory or computer-readable medium accessible by the respective processor. Examples of suitable types of memory include any type of random access memory (RAM), any type of read-only memory (ROM), or any other type of flash memory that may be used to carry or store computer program code in the form of computer-executable programs, instructions, or data. Each of processors 312 and 326 may also include a portion of memory accessible only to the respective processor, commonly referred to as "cache." Thus, each memory may be part of the respective processor, may be separate, or may be split between the relevant processor and one or more separate memory devices.

Each of memories 314 and 328 includes computer-executable program code or instructions that, when executed by the respective processor, perform at least a portion of the processes and functions described in more detail below. The memory may also include one or more data structures for storing information, such as a database or a table. It is to be appreciated that such computer-executable program code or instructions in this scenario can include one or more application programs, other program modules, program data, firmware, drivers, and/or an operating system. In an example, portions 316 and 332 of respective memories 314 and 328 include one or more encryption algorithms, keys, and/or codes used to encrypt and decrypt information, as described in more detail below. One use of the encryption keys stored in the memories, for instance, is to allow controllers 204 and 206 to communicate securely with one another.

In one example, the encryption information that allows the controllers to securely communicate can be provided to the controllers and stored in portions 316 and 332 of memories 314 and 328 when the controllers are manufactured in order to ensure security. In other examples, the controllers 204 and 206 can negotiate the encryption information. In any case, controllers 204 and 206 exchange digital certificate and/or encryption information stored in respective portions 316 and 332 of memories 314 and 328 in order for controller 206 to authenticate controller 204 and authorize the communications between the two controllers described below. In one example, this may be accomplished through the use of a "clean room" where the controllers are mutually authenticated to one another in a secure environment, such as once manufacture has completed and prior to installation into fuel dispenser 200. Encryption information provided by host 230 that allows controller 206 to encrypt sensitive payment data associated with the host and communicate therewith securely, as explained in more detail below, may also be stored in portion 332 of memory 328 at this point. It should be appreciated that hosts associated with other payment cards may also supply encryption information specific to the respective host to controller 206 to be stored in portion 332 of memory 328 at the same time. As should be understood in the art, each encryption scheme allows controller 206 to encrypt sensitive payment data to be transmitted to the host associated with the scheme, where only the specific host is able to decrypt the sensitive payment data for processing based on the scheme.

As noted above, each of controllers 204 and 206 includes respective security sensors 342 and 344. These security sensors operate to either erase the information contained in the corresponding processor and secure memory of the respective controller or otherwise decommission one or both of the controllers when triggered. For instance, the security sensors may be physical microswitches, as explained in more detail below with respect to FIGS. 4 and 5, that cause the respective processor to erase the contents of the memory associated with the processor when the relevant microswitch has been triggered. In an example, each of processors 312 and 326 is a secure microcontroller (e.g., a 32-bit microcontroller), such as a Universal Secure Integrated Platform (USIP) chip provided by Maxim Integrated Products of Austin, Tex. Additional information regarding anti-tampering security sensors configured to erase any information contained in a corresponding controller, processor, and/or secure memory may be found in the Ser. No. 12/975,502 application referenced above.

Figure 4:
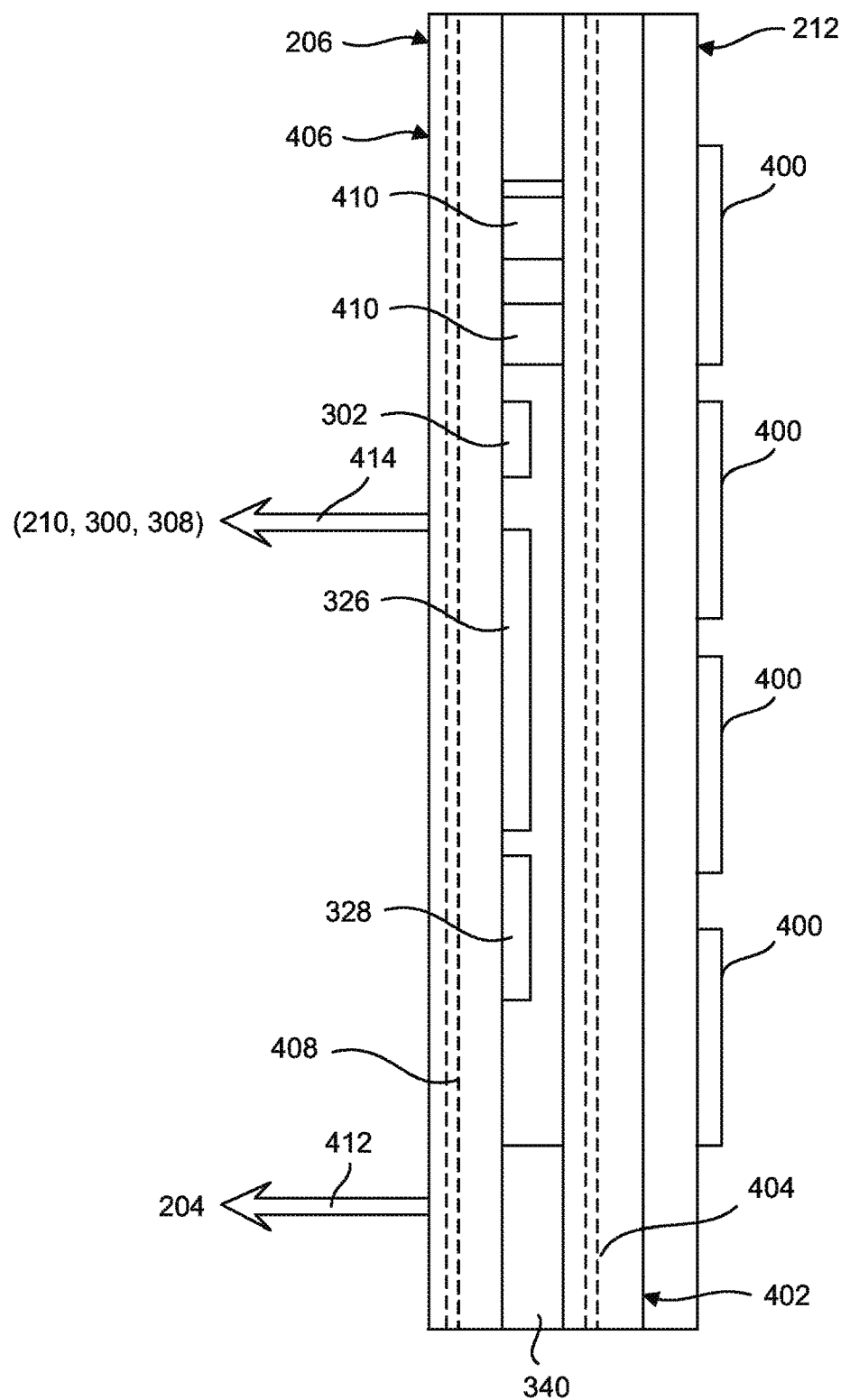
FIG. 4 is a diagrammatic side elevation view of a personal identification number (PIN) pad and corresponding controller of a user interface for a fuel dispenser in accordance with aspects described herein.

FIG. 4 is a diagrammatic side elevation view of PIN pad 212 and controller 206 in accordance with one example. As should be understood in the art, PIN pad 212 includes a plurality of keys 400 affixed to a PCB 402. PCB 402 can be equipped with one or more tampering detection mechanisms, such as a mesh layer 404. Controller 206 also includes a PCB 406, which includes a mesh layer 408 configured to detect tampering similar to mesh layer 404. An example of a mesh layer suitable for use as mesh layers 404 and 408 may be found in the Ser. No. 13/105,557 application referenced above.

For example, security sensors 344 (FIG. 3) can include a pair of physical microswitches 410, as described above, that are operatively connected to processor 326 and located so as to come into contact with PCB 402. In another example, microswitches 410 are attached directly to processor 326 rather than to PCB 406. Separation of PCB 402 from PCB 406 activates one or more of microswitches 410, which transmits a signal to processor 326. In one example, the signal can decommission controller 206 or otherwise render the controller inoperable. In another example, the signal causes processor 326 to erase any data within controller 206 necessary to ascertain any payment data stored by the controller, such as the encryption information stored within portion 332 of memory 328 or the payment data itself, when one or more microswitches are triggered. In this example, payment data within controller 206 cannot be ascertained should PCBs 402 and 406 become separated or if microswitches 410 are otherwise triggered.

Controller 206 communicates with controller 204 via Ethernet adapter 340 as denoted by arrow 412. Arrow 414 denotes the communication path(s) by which controller 206 communicates with card reader 210, contactless card reader 300, and additional components 308.

Figure 5:
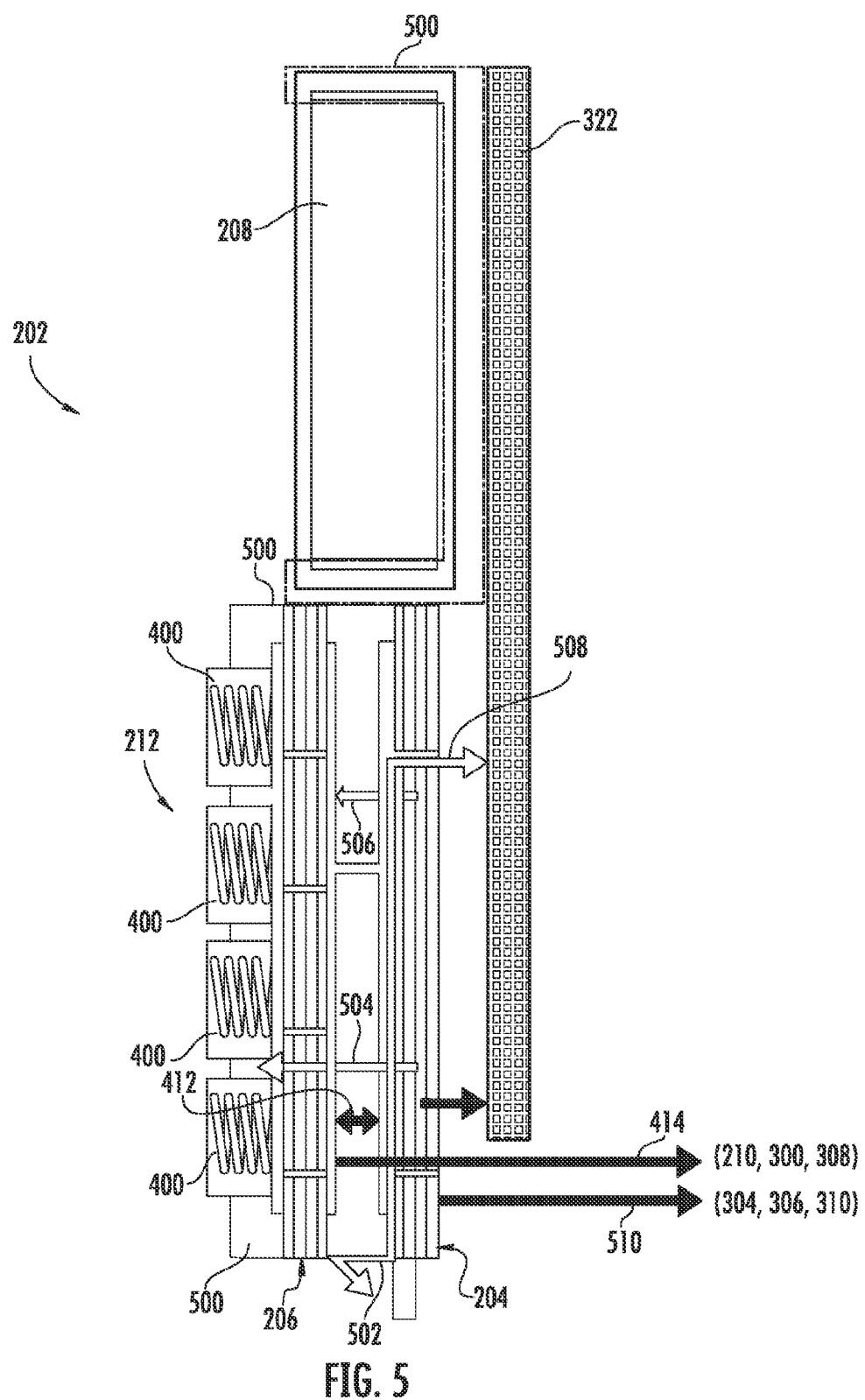
FIG. 5 is a diagrammatic side elevation view of a user interface of a fuel dispenser in accordance with aspects described herein.

Controller 206 may also be physically connected to controller 204, which may be accomplished in a manner similar to that described in the Ser. No. 12/797,094 application referenced above. Referring to FIG. 5, for example, controller 206 is located adjacent to controller 204, both of which are affixed to a housing or a frame 500. In this example, display controller 322 is an external graphics board connected to controller 204 and display 208, as explained in more detail in the Ser. No. 12/797,094 application. Arrow 510 denotes the communication paths by which controller 204 communicates with printer 304, soft keys 306, and additional components 310. In an example, user interface 202 includes microswitches 502, 504, 506, and 508. Microswitch 502 activates should controller 204 and housing 500 become separated, while microswitch 508 activates should controller 204 and display controller 322 become separated. Similarly, microswitch 504 activates should keys 400 become separated from either of controllers 204 and 206, while microswitch 506 activates should controller 204 become separated from controller 206.

It is to be appreciated that these microswitches may be operatively connected to either or both sets 342 and 344 of security sensors of controllers 204 and 206, respectively, to allow either or both controllers to determine when a microswitch has been activated. In one example, for instance, sets 342 and 344 of security sensors are routed to special inputs inside the respective secure processor 326 or 312. The secure processors include logic to determine when a security sensor has been activated and are connected to a battery back-up to continue operating if the respective processor is disconnected from its main power supply. When a controller receives an indication that one of the microswitches has been triggered, the controller can be decommissioned and can become inoperable, as described above. Either or both controllers can remain in an inoperable state until resolved by an authorized technician. As a result, the entire user interface 202 can be decommissioned and inoperable until examined by the technician. In another example, when a controller receives an indication that one of the microswitches has been triggered, the controller's processor can erase the entirety of the controller's secure memory or the portion thereof containing decryption keys or other access criteria to prevent unauthorized access to any data stored in the memory.

While FIG. 5 illustrates the use of microswitches 502, 504, 506, and 508, it is to be appreciated that additional or alternative microswitches, as well as other configurations and arrangements of microswitches, may be employed by user interface 202 to detect tampering without departing from the scope of the subject matter as described.

The following description provides a specific example of fuel dispenser 200 and user interface 202 with reference to FIGS. 1 through 5. Processor 326 of a fuel dispenser 200 (e.g., fuel dispenser 200a or 200b) retrieves display data from secure memory 328 to present to the user via display 208 and transmits the data to controller 204 with an instruction to display the data. In this example, the display data may include instructions related to initiating the fueling process (e.g., text that instructs to swipe a debit or credit card or to prepay from within central facility 102). Controller 206 can operate user interface 202 in a secure state based on initiation of the fuel process, as controller 206 may receive payment data. Controller 206 may determine when to place user interface 202 in a secure state depending on the current stage of the fueling process or upon an action or event triggered by the user, such as providing a magnetic stripe card to card reader 210 (e.g., in response to the instructions presented via display 208), activating a PIN pad 212 for entry of a PIN or billing zip code associated with a scanned card), etc., for example. Processor 326 stores data in portion 330 of secure memory 328 indicating that user interface 202 has been placed in a secure state.

Information received by the components operatively connected to controller 206, including payment data, is transmitted by the respective component to processor 326. If user interface 202 is not in a secure state as indicated by security state 330 when the payment data is received, processor 326 can place the user interface in a secure state (e.g., as described above) based in part on identifying the security state 330. Processor 326 processes the payment data as defined by the computer instructions stored in secure memory 328. For instance, processor 326 may encrypt the sensitive payment data using the encryption information provided by host 230 stored in portion 332 of secure memory 328. Processor 326 may also encrypt the non-sensitive payment data (that is incapable of identifying the account of the payment card) using the encryption information stored in memory portion 332 common to controllers 204 and 206, in an example. Processor 326 transmits the encrypted data to controller 204 via Ethernet adapter 340 using TCP/IP.

Controller 204 receives the encrypted information via Ethernet adapter 324 and handles transmission of the information, which may include, for instance, forwarding the information in its entirety to POS 106, site controller 108, another device within fueling environment 100, and/or host 230. In another example, controller 206 may transmit different portions of the information to some or all of these devices so that the respective device may process the portions of information it receives. This may be accomplished based on instructions received by controller 204 from controller 206 or may be defined by computer instructions stored within secure memory 314.

In the present example, processor 312 receives an indication that fuel dispenser 200 is authorized to dispense fuel, which may be provided by POS 106, site controller 108, host 230, or controller 206 depending on the configuration of fueling environment 100. As a result, processor 312 instructs valve 220 to open to allow fuel to flow to hose 222, nozzle 224, and the user's vehicle. While in the secure state, processor 326 may retrieve additional display data from memory 328 and transmit it to controller 204 with an instruction to provide the data to display 208 (e.g., for presenting to a user).

At any point during the fueling process, controller 206 may instruct controller 204 to present information unrelated to the fueling process via display 208, such as advertisements. Based on the instruction, a period of time elapsed since securing user interface 202, an indication from another component, etc., controller 206 can place user interface 202 in a non-secure state and store an indication of such in security state 330 of secure memory 328. The material to be presented may be stored in secure memory 314 or 328 or may be transmitted to controller 204 by a resource external to fuel dispenser 200, such as POS 106, site controller 108, host 230, or another resource operatively connected to WAN 228. Alternatively, information to display may be supplied to controller 204 from another external source via auxiliary video input 311. It should thus be appreciated that controller 206 can be configured to drive controller 204 as to the material presented to the user via display 208. For instance, controller 206 determines when controller 204 may present material from another source, such as auxiliary video input 311, depending on the security state 330 of controller 206. Controller 204 is configured to handle presentation of the material to the user via display 208 based on the instructions from controller 206.

In one example, other devices, such as controller 204, additional components 310, auxiliary input 311, or POS 106, may request presentation of information to the user via display 208. In such an example, controller 204 may be configured to request authorization from controller 206 to display the information. Upon receipt of the request from controller 204, processor 326 identifies the current security state as stored in portion 330 of secure memory 328. If controller 206 is in a secure state, processor 312 then determines whether controller 206 has requested or received any payment data from the user that has not been processed by controller 206 or transmitted to controller 204. If so, processor 326 does not change the security state and denies or caches the request. If controller 206 is in a secure state but has processed and transmitted any payment data it received, processor 326 may then place user interface 202 in a non-secure state by storing the appropriate indication in security state 330 and authorizing the request. If user interface 202 is in a non-secure state, controller 206 may authorize controller 204 to present the requested information. An example of a process for determining whether to display the requested information is set forth in the Ser. No. 13/117,793 application referenced above and may be accomplished via any suitable configuration, such as that described in the Ser. No. 13/197,440 application referenced above.

In one example, when controller 206 is in a non-secure state, it may disable the devices operatively connected to the controller that are configured to receive information from the user, such as described in the Ser. No. 13/117,793 application, for instance. The devices can include PIN pad 212, card reader 210, etc. Other devices that accept input from the user but are incapable of receiving payment data, such as soft keys 306, may remain enabled. This prevents any unauthorized material from using user interface 202 to elicit payment data from the user. In this regard, controller 206 is referred to herein as a secure controller 206.

Should controller 206 determine to present material or information via display 208, the controller 206 can transmit a service message to controller 204 that preempts any non-secure material currently being presented. Controller 206 can place user interface 202 in a secure state by storing an indication of such within security state 330, which controller 206 may do at the time it transmits the service message to controller 204, after receiving confirmation from controller 204 that the service message has been received and/or executed, etc. Controller 206 may then transmit the material to be presented along with the service message (e.g., once the controller has received confirmation from controller 204 that the message was received and/or acted upon). It is to be appreciated that controller 204 is configured so that tampering with the computer instructions executed by the processor is not allowed. As a result, controller 204 is configured to receive the service message from controller 206 and process accordingly. For example, controller 204 can prevent non-secure material or material that has not been provided by controller 206 from being displayed once controller 204 receives the service message from controller 206. Thus, it is to be appreciated that the configuration described above provides an example of a user interface where secure prompting or other material provided by one controller preempts prompting or material from the other controller or received from another source.

Once the fueling process has completed, controller 204 performs any ancillary tasks, which may include transmitting the final amount of the dispensed fuel to controller 206, POS 106, site controller 108, host 230, or another device for processing. This may also include instructing display 208 to present additional text to the user and/or instructing printer 304 to print a receipt for the transaction, as should be known in the art, based on instructions provided by controller 206, POS 106, site controller 108, host 230, and/or any other device, depending on the configuration of fueling environment 100.

It is to be appreciated that the above provides a description of a user interface for a retail device that includes two controllers. The first controller is configured to manage operation of the retail device and is operatively connected to components that are not configured to receive payment data or other sensitive information. The second controller is configured to handle receipt of payment data and is operatively connected to any component of the retail device capable of receiving payment data, such as a PIN pad and/or card reader. Thus, payment data received by the retail device can be confined to processing by the second controller. As a result, controller 206 and portions of controller 204 are included within a security zone as denoted by dashed area 346 that can securely handles payment data received via the user interface 202.

The second controller also determines and stores an indication of the security state of the user interface and instructs the first controller what to display depending on the security state. For instance, the second controller instructs the first controller what material to display or what source to receive material to display and when to display it. Thus, in at least one example, any prompt or information displayed to the user can be provided and/or authorized by the second, secure controller. As described further herein, the secure controller can control access of other controllers or devices to one or more components, and/or can be secure by anti-tampering hardware mechanisms. The second controller may also be configured to enable and disable the input devices of the user interface based on the security state.

The two controllers can be configured to communicate securely via Ethernet adapters using TCP/IP pursuant to encryption information stored in the respective secure memory of each controller. Each controller also includes security sensors configured to decommission the user interface and/or erase any payment data stored by the controller if the sensors detect that the controller has been tampered with.

It should be appreciated, however, that while portions of controller 204 are illustrated as being within security zone 346, controller 204 may not be required to satisfy heightened security measurements and certifications for devices that handle sensitive payment data in an unencrypted format because the controller does not handle such data. That is, controller 204 may be unable to decrypt any sensitive payment data it receives from controller 206. In this example, secure memory 314 does not include any encryption information that would allow controller 204 to decrypt any sensitive payment data received from controller 206. Controller 204 is instead configured to route the sensitive payment data received from controller 206 to the device configured to handle processing of the data.

In one example, controller 206 stores one set of encryption information in portion 332 of secure memory 328 that allows controllers 204 and 206 to communicate securely and another set of encryption information that allows controller 206 to securely encrypt payment data, or other sensitive information, received by controller 206, such as the host encryption scheme described above. As a result, devices configured to handle processing of the payment data, or other sensitive information, are able to decrypt the payment data, which does not include controller 204 and may include host 230 in certain examples. That is, the encryption information stored in portion 316 of secure memory 314 may be sufficient to allow controllers 204 and 206 to communicate securely but may be insufficient to allow controller 204 to decrypt any sensitive payment data received by controller 206.

In another example, controller 206 is operatively connected to the device within fueling environment 100 that is configured to effect payment transactions or communicates directly with host 230. In such examples, controller 206 handles the receipt of the payment data, or other sensitive information, received by the components operatively connected to the controller 206. In this example, controller 206 also processes, encrypts, and transmits the payment data to the device configured to effect payment transactions directly rather than indirectly via controller 204. As a result, controller 204 does not receive any payment data, or other sensitive information. Controllers 204 and 206 continue to communicate via Ethernet adapters 324 and 340 so that, for instance, controller 206 provides controller 204 with an amount of information sufficient to print a receipt for a fueling transaction, as described above. Additionally, controller 206 continues to instruct controller 204 what information may be presented via display 208, or, alternatively, controller 204 continues to request authorization from controller 206 as to whether information may be presented.

It should be appreciated that the configuration described above allows controller 204 to execute applications that are otherwise non-secure and to provide the applications with access to display 208, depending on the security state as determined by controller 206, without having access to any internal components of controller 206. It should also be appreciated that such a configuration allows changes to the design of controller 204 and/or display 208, which may not be subject to heightened security standards since those components do not handle any unencrypted sensitive payment data, without subjecting the portions of user interface 202 that do handle such data to recertification. Referring specifically to FIG. 5, for example, the combination of controller 204, external graphics controller 322, and display 208 may be replaced or redesigned, such as to increase the size of the display, without recertification since these components do not handle unencrypted sensitive payment information. It is to be appreciated that this allows replacement of these components without subjecting controller 206, which is configured to handle unencrypted sensitive payment information, to recertification.

In another example, display 208 is operatively connected to controller 206 rather than controller 204. As a result, controller 206 determines what information may be presented via display 208 depending on security state 330 in a manner similar to that explained above. Processor 326 may use the process described in the Ser. No. 13/117,793 application referenced above to determine whether to present information via display 208, which may be accomplished via the configuration described in the Ser. No. 13/197,440 application referenced above. In such examples, controller 204 may continue to request presentation of non-secure material to the user via the display in a manner similar to that described above. It should be appreciated that display 208 may also be operatively connected to controller 206 rather than controller 204 (e.g., when the display is capable of receiving payment data, such as in the case of a touchscreen).

In this example, display 208 can be equipped to present PIN pad 212 as a virtual PED on the display 208 (in which case a hardwired PIN pad 212 may not be present in the fuel dispenser 200). Moreover, in this example, controller 206 can operate the display 208, and controller 204 can be omitted (and/or replaced by a display controller 322), as described in more detail below. In this example, various possibilities are described in connection with securing controller 206 and/or sensitive communications to/from display 208. In one example, the touchscreen can be limited by controller 206 (e.g., in a number of touchable regions, in displaying information only in certain regions, etc.) when used by non-secure applications, and less limited when used by secure applications. Examples of limiting touchscreen displays is described in the Ser. No. 12/695,692 application referenced above. Moreover, display 208 can limit touchable areas by excluding certain regions where some information is displayed, such as fuel dispensing amount, transaction amount, etc., to ensure this data is not modified.

Figure 6:
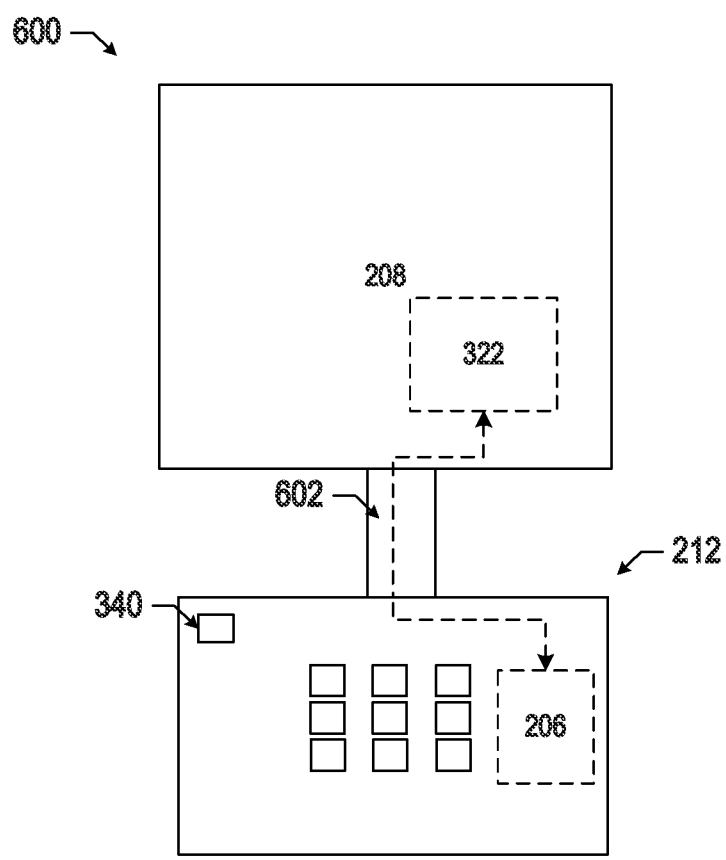
FIG. 6 is a diagrammatic representation of components of a user interface of a fuel dispenser in accordance with aspects described herein.
Figure 7:
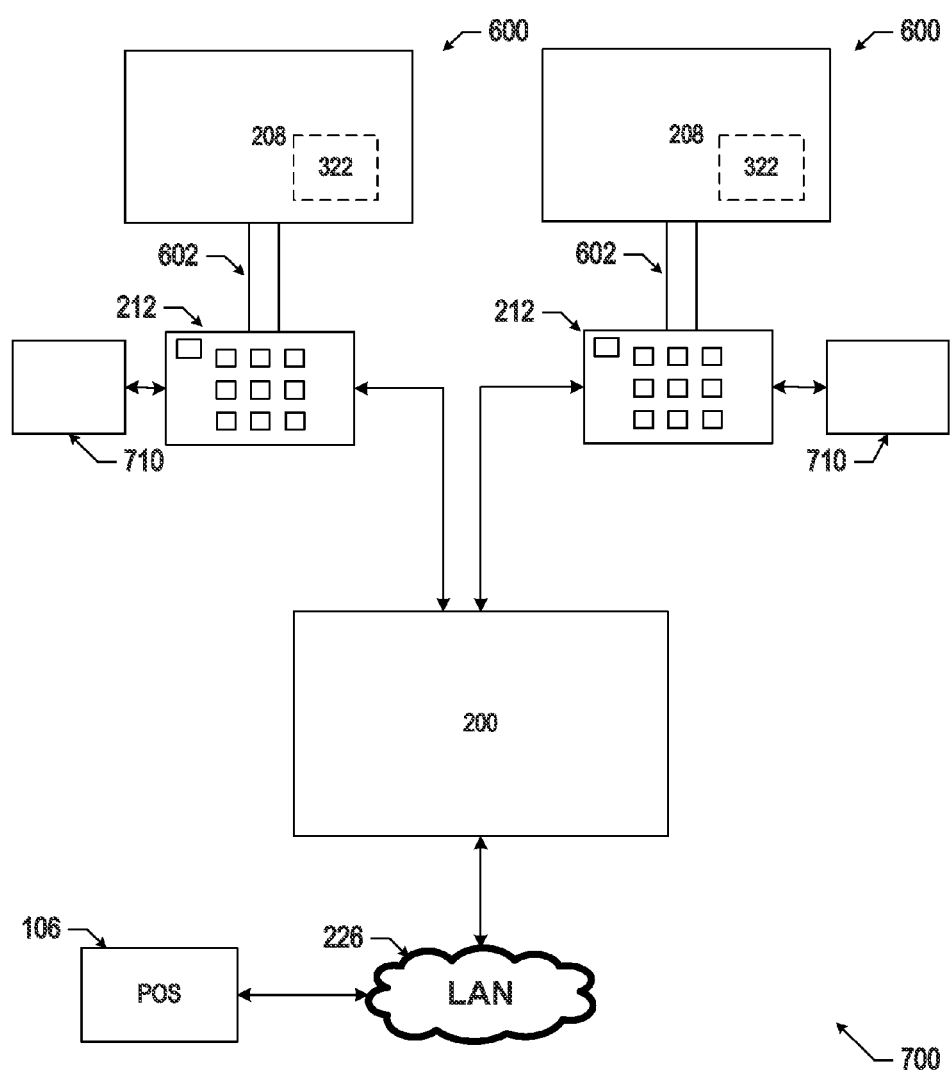
FIG. 7 is a diagrammatic view of a fuel dispensing system in accordance with aspects described herein.
Figure 8:
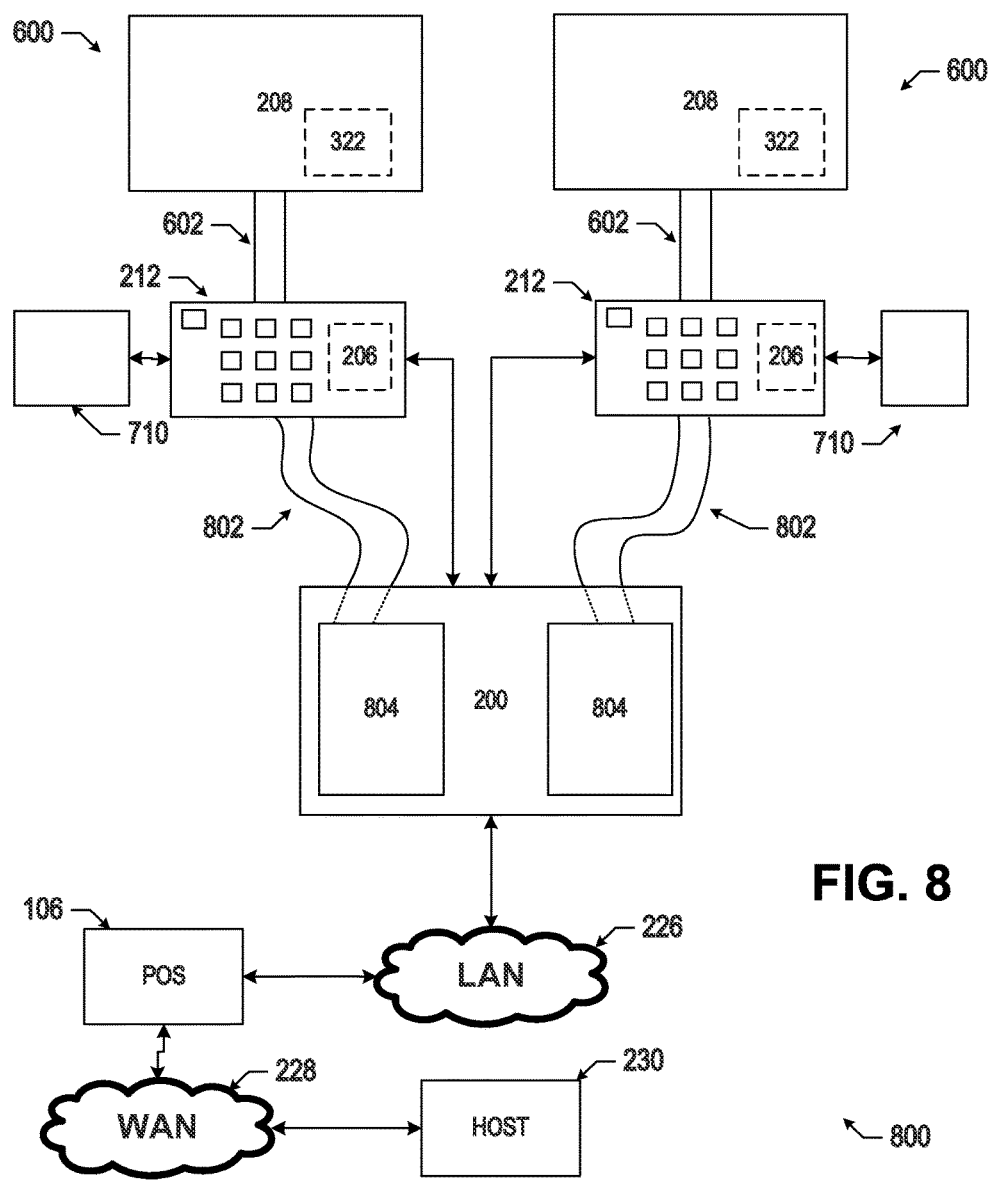
FIG. 8 is a diagrammatic view of a fuel dispensing system in accordance with aspects described herein.

FIGS. 6-8 illustrate examples where controller 204 is omitted. Instead, the housing of PIN pad 212 can include the controller 206, which is used to control a "dumb" display. In this example, the dumb display may house display controller 322.

Referring now to FIG. 6, a tamper-proof interface system 600 is illustrated including a display 208 and a PIN pad 212 that are physically separated from each other but communicatively coupled via a wired or wireless connection. In one example, display 208 and PIN pad 212 are coupled via a flexible circuit assembly. In this regard, display 208 can have a PCB physically separated from a PCB of PIN pad 212. Controller 206 may be included on the PCB housed in PIN pad 212 and can directly control display controller 322 that is in the housing of display 208. In this example, controller 204 is not present on the PCB of PIN pad 212 or of display 208. Accordingly, in this example, secure operations (e.g., processing of payment or other sensitive information) occur on the PCB of PIN pad 212, while standard display operations can occur in display 208. In any case, secure controller 206 can accordingly operate the PIN pad 212 and display 208, and can thus control data provided to/from display 208 to provide security for data from PIN pad 212. As such, display 208 can be a standard or "dumb" display and can be easily replaced or upgraded without having to also replace or recertify PIN pad 212. In addition, controller 206 controls communications to/from display 208 (e.g., via a software or firmware drivers), which can prevent tampering with PIN pad 212 via a communication path of display 208.

According to one example, flexible circuit assembly 602 may take the form of a tamper-proof cable such as that described in U.S. patent application Ser. No. 13/467,592, which is incorporated by reference in its entirety. In this example, flexible circuit assembly 602 includes two or more layers and is in electrical communication with a secure area in PIN pad 212. Each of these layers can include a thin, flexible dielectric substrate having conductors thereon. The signal conductors can be surrounded with a conductor pattern defining a wire mesh. Thus, if access is attempted via the signal conductors, such as by separating the layers, the wire mesh is interrupted, which can trigger an event. For example, as described, such events can include causing erasure of certain information (e.g., encryption information, payment or other sensitive information, etc.), decommissioning of controller 206, PIN pad 212, display 208, etc., and/or the like. In an example, a suitable adhesive is used to connect these various layers together to form the mesh.

When assembled, these layers define a cable extending between a first connector portion and a second connector portion. One end of flexible circuit assembly 602 can connect to display 208 via the first connector portion, and another end of flexible circuit assembly 602 can connect to PIN pad 212 via the second connector portion. The first and second connector portions may take the form of any secure connector device, such as connector portion 312 discussed in U.S. patent application Ser. No. 13/467,592. The first and second connector portions are preferably connected to display 208 and PIN pad 212, respectively, using a suitable adhesive, such as the conductive adhesive described in U.S. patent application Ser. No. 13/467,592.

As noted above, the cable includes internal conductors that directly connect and allow electronic communications between controller 206 of the printed circuit board within PIN pad 212 and display controller 322 of the printed circuit board within display 208. This allows PIN pad 212 to send data, such as display data, securely to display 208 within tamper-proof flexible circuit assembly 602.

Because of the flexibility of flexible circuit assembly 602, it will be appreciated that display 208 can be hingedly-moved relative to PIN pad 212 while being electrically connected to PIN pad 212. Additionally, the flexible circuit assembly 602 allows display 208 to be mounted at a physical location on the fuel dispenser separate from the mounting location of PIN pad 212.

In an example, flexible circuit assembly 602 can be a ribbon-cable or similar cable that couples components for communication therebetween. In one example, flexible circuit assembly 602 can include multiple cables, where at least one cable carriers video data, and the other cable is used for security detection. In one example, one cable facilitates communicating display data between PIN pad 212 and display 208 and has security mesh layers, as described, triggering an event if tampering is detected. This cable can additionally include a switch circuit at least at one connector of the cable that utilizes a ground connection at the component to detect removal of the cable, which can trigger an event (e.g., memory erasure, component decommissioning, etc.). In this example, another cable can provide the security mesh circuit series-connected with two dome switches (or other suitable switches to detect separation or movement of one or more components), and can be bonded or otherwise mounted to the other cable and/or can loop such that a dome switch is used to determine if a bracket over a connector of the other cable is disassembled, which can trigger an event. This cable can continue to another dome switch between display 208 and a bezel, or other portion of a fuel dispenser, to determine if display 208 is removed therefrom; this can also trigger an event.

In any case, the triggered events can cause various functionalities, and triggering of different switches can cause different event functionalities, in an example. In addition, the functionalities can require different resolutions. For example, removal of display 208 from the bezel can cause decommissioning of the PIN pad 212 and/or display 208, such that the display can be reinstalled to contact the bezel, and normal operation can resume. Removal of cable 602 from display 208, however, can cause erasure of encryption information used to communicate between PIN pad 212 and display 208. Reestablishing encryption information can require a technician to replace the display 208 in the bezel, reinitialize encryption information between a new display 208 and PIN pad 212 in a clean room for reinstallation in the fuel dispenser, and/or the like. It is to be appreciated that various triggerable events can be used in this regard with varying remedial measures to reset the events.

FIG. 7 illustrates a fuel dispensing system 700 using two interface systems 600 of FIG. 6. Fuel dispensing system 700 includes a fuel dispenser 200, one or more interface systems 600, LAN 226, POS 106 and card reader or contactless payment system 710. As discussed above with regard to FIGS. 1 and 2, fuel dispenser 200 operates to dispense fuel and includes interface systems 600 to facilitate payments from the user and to display fueling status. Card reader or contactless payment system 710 may work in concert with each respective interface system 600 to effect payment fuel dispensed at fuel dispenser 200. Each interface system 600 includes flexible circuit assembly 602 to provide tamper-proof communications between display 208 and PIN pad 212, as discussed above with regard to FIG. 6. As such, when a user intends to dispense fuel, the user provides an indication that the user wishes to provide payment information, such as a credit card, at fuel dispenser 200. Controller 206 of PIN pad 212 then provides prompts or other video directly to display controller 322 in display 208, which in turn displays the prompts or other video on display 208. In response to prompts on display 208, the user provides payment data via card reader or contactless payment system 710. Upon successful authentication of the payment data, the fuel may be dispensed by the user. In addition to facilitating the initial payment information, controller 206 may provide other video information directly to controller 322 of display 208, such as fueling status or other payment information. As such, display 208 simply displays the video data sent by controller 206 of PIN pad 212 without encryption of the video data. In this regard, because the data is provided from the PIN pad 212 securely to display 208 via flexible circuit assembly 602, the display is "dumb" and simply displays the video data provided via secure flexible circuit assembly 602.

FIG. 8 illustrates another fuel dispensing system 800 which also uses two interface systems 600 of FIG. 6, but additionally provides for video services from a host 230 of other external feature source. Fuel dispensing system 800 includes a fuel dispenser 200, two interface systems 600, LAN 226, POS 106, WAN 228 and host 230. Fuel dispensing system 800 allows for similar fueling operation as described above for FIG. 7. Additionally, host 230 may provide video, such as advertisements, on display 208 via WAN 228, POS 106, LAN 226 and fuel dispenser 200. Secure communications between the fuel dispenser 200 and display 208 can be beneficial in this example, as a third party can provide the video feed on display 208.

As mentioned above, flexible circuit assembly 602 provides secure, tamper-proof communications between display 208 and PIN pad 212. To communicate data securely between fuel dispenser 200 (e.g., the internal electronics or fuel dispensing components of fuel dispenser 200) and PIN pad 212, an additional cable 802 is provided between fuel dispenser 200 and PIN pad 212. Cable 802 may be any suitable type of cable, such as a standard cable or a cable assembly similar to flexible circuit assembly 602. The cable can include an Ethernet cable, USB cable, and/or the like.

Given the above, host 230 is able to send video data through WAN 228, POS 106, and LAN 226 to reach feature electronics 804 in fuel dispenser 200. It is noted that host 230 may be an entity that is separate from the owner of the fuel dispensing system. Thus, a third party may be allowed to display video or images on display 208 in a secure fashion. A discussion of how the video or images are routed securely from host 230 to display 208 using controller 206 (but not controller 204) is provided below.

Feature electronics 804 may include a processing system which controls handling of data to and from fuel dispenser 200 as well as other electronic operations of fuel dispenser 200, as discussed in U.S. patent application Ser. No. 13/197,440. In this regard, feature electronics 804 transmit the video data received from host 230 via cable 802 to controller 206 of PIN pad 212. Controller 206 of PIN pad 212 forwards the video data to display controller 322 of display 208 via flexible circuit assembly 602. If flexible circuit assembly 602 detects tampering therewith, as described, the processor of controller 206 at PIN pad 212 triggers an event, which can include erasing the memory associated therewith, decommissioning one or more components to prevent the video data to be displayed on display 208, etc. As such, controller 204 is omitted in the example illustrated in FIG. 8, but it is to be appreciated that this controller can be present to receive video data from controller 206 for presenting on display 208, for example (e.g., as a display controller 322).

PIN pad 212 includes controller 206 and communications between PIN pad 212 and "dumb" display 208 is secure over flexible circuit assembly 602. Display 208 can include a display controller 322, as described, for displaying received video data. Additionally, communications between PIN pad 212 and feature electronics 804 in fuel dispenser 200 may also be secure so that the complete path from feature electronics to display is secure. This can be implemented by similarly using another controller or PCB at feature electronics 804 and/or implementing one or more security policies for communicating with PIN pad 212 or related controller. In addition, for example, PIN pad 212 (or secure controller 206 for example) can deactivate a connector of PIN pad 212 to which flexible circuit assembly 602 connects when the PIN pad 212 is activated to mitigate tampering with PIN pad 212 via the flexible circuit assembly 602. When the PIN pad 212 is no longer user or is otherwise deactivated, PIN pad 212 (or secure controller 206) can enable the connector to allow data from feature electronics 804 to pass over flexible circuit assembly 602.

Figure 9:
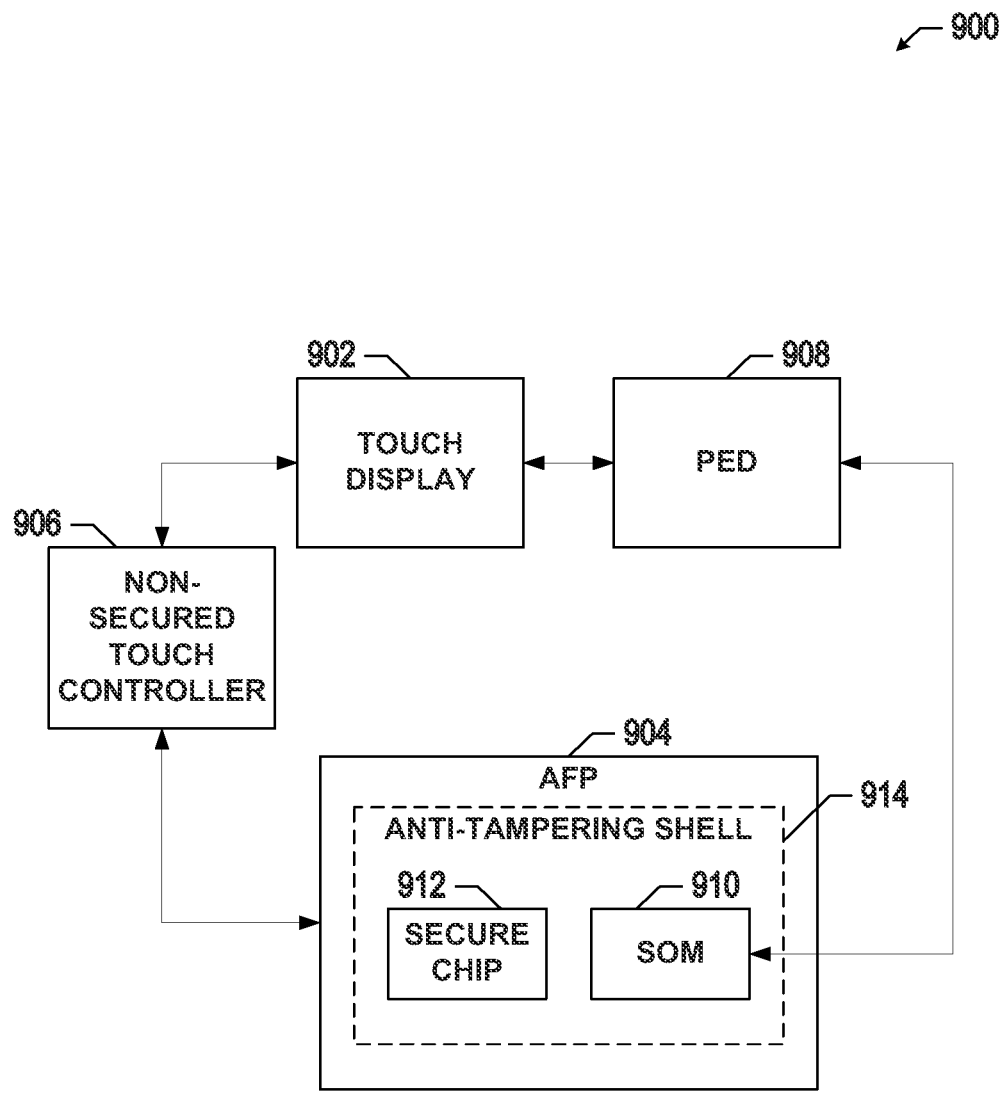
FIG. 9 is an example system for employing in a fuel dispenser to allow touchscreen input.

FIG. 9 illustrates an example system 900 for employing in a fuel dispenser to allow touchscreen input. System 900 can be employed by a user interface, such as user interface 202, in one example. System 900 includes a touch display 902 that can be utilized by an auxiliary feature processor (AFP) 904 via a non-secured touch controller 906 or a PED 908. For example, touch display 902 can be similar to display 208, AFP 904 can be similar to or can include the feature electronics 804 described above, and/or PED 908 can be similar to PIN pad 212 (e.g., and can include a controller 206 to secure access to touch display 902). Thus, AFP 904 can provide data from one or more applications to touch display 902 via PED 908, as similarly described in FIG. 8, and can include the non-secured touch controller 906 to receive touch coordinates or other input events from touch display 902.

Implementing touchscreen functionality on touch display 902 can introduce additional entry points for obtaining sensitive information from a customer using the touch display 902. In this regard, additional physical or virtual security measures can be used to mitigate tampering with the touch display 902 by non-authenticated entities. For example, AFP 904 includes a SoM 910 that is used to authenticate applications for accessing touch display 902 via PED 908, and a secure chip 912 for providing security information to SoM 910 for establishing a secure channel to PED 908. In this regard, AFP 904 implements a secure area defined by the SoM 910 that allows secure access to touch display 902. Furthermore, in this or other examples, SoM 910 and secure chip 912 are encased in an anti-tampering shell 914 to prevent physical access thereof. In addition, for example, the AFP 904 can be installed on a hub interface PCB (HIP), which can include two AFPs (e.g., one on each side) for a dual sided fuel dispenser.

According to an example, SoM 910 can establish a secure channel with PED 908 for facilitating access of touch display 902 via PED 908. For example, SoM 910 can obtain secrets, encryption keys, or other security information from secure chip 912 for establishing the secure channel with PED 908. In one example, secure chip 912 and SoM 910 are separate components, which can allow SoM 910 to be an off-the-shelf product. In this example, secure chip 912 can be paired with SoM 910 based on an identification parameter of the SoM 910 (e.g., a media access control (MAC) or similar address) to prevent future replacement of the SoM 910 without commissioning thereof for use with secure chip 912. In this example, the secure chip 912 and SoM 910 can be paired in a secure room by an authenticated entity (e.g., an entity that configures the security information between the secure chip 912 and the PED 908, such as a fuel dispenser manufacturer), or otherwise paired upon installation within a related fuel dispenser and/or initialization of the secure chip 912 and/or SoM 910. In other examples, however, it is to be appreciated that the SoM 910 can comprise the secure chip 912. In either case, the secure chip 912 can be initialized with security information related to PED 908 (e.g., in a secure room, upon installation and/or initialization, etc.).

In any case, SoM 910 obtains the security information from secure chip 912 for establishing the secure channel with PED 908. It is to be appreciated that secure chip 912 can confirm the identification parameter (e.g., MAC address) of SoM 910 before providing the information where the SoM 910 and secure chip 912 are separate components. SoM 910 and PED 908 accordingly establish the secure channel, which can include communicating context information based on the security information for subsequent communications therebetween, or communicating the security information in each subsequent communication. In one example, PED 908 can download a trusted application to SoM 910 for subsequently verifying content signatures and/or a list of authenticated signatures to allow the SoM 910 to validate signatures of applications for providing access to touch display 902, as described below.

PED 908 can employ a secure controller for the display 902 (such as secure controller 206, or a related firmware or software driver), and can generally allow data received from SoM 910 over the secure channel to pass to touch display 902 over a connector (similar to the connector described above). It is to be appreciated, however, that PED 908 can disable the connector (e.g., using a secure controller, such as controller 206) while PED 908 is activated to receive sensitive information from a customer, as described. In this regard, PED 908 can authenticate other components, such as SoM 910, for accessing touch display 902.

In this regard, SoM 910 can be considered a trusted device at the PED 908 when the secure channel is established with PED 908. SoM 910 can, thus, manage which applications receive access to touch display 902 by verifying whether the applications are signed by a trusted or otherwise authenticated entity. For example, SoM 910 can evaluate a signature of one or more applications executing on AFP 904 in determining whether to allow the application to access touch display 902. SoM 910 can store a list of signatures for trusted or authenticated entities, to which SoM 910 can compare a signature of one or more applications. For example, the list can be programmed in the SoM 910, received from PED 908, etc. In an example, an operator of a retail site where a related fuel dispenser is deployed can be charged with verifying a signature or identity of an application, and allowing the application with a signature related to the site operator (or specific site) to access touch display 902 via SoM 910. In this example, SoM 910 can include a signature of the retail site for comparing to signatures of applications executing via AFP 904. Thus, where the retail site signs the application, SoM 910 can allow the application to access touch display 902.

Thus, SoM 910 can provide data to touch display 902 via PED 908 for given authenticated applications. In one example, SoM 910 can provide varying levels of access for different signatures, such as full access to touch display 902 for applications signed by a manufacturer of the fuel dispenser, more limited access to touch display 902 for applications signed by a merchant (e.g., a limited number of touch regions), and/or the like using the driver. In any case, SoM 910 can manage the levels of access to ensure certain applications are allowed only certain functions based on the associated signature.

Appropriately signed applications executing on AFP 904 can access touch display 902 via SoM 910, and can implement functions based on captured touchscreen input events on the touch display 902. For example, an application can display data on touch display 902 via SoM 910, and non-secured touch controller 906 can capture interactions on the touch display 902, such as coordinates of a touch, coordinates or other data regarding a swipe or other interactive movement with the touch display 902, etc. Non-secured touch controller 906 provides information regarding such coordinates or movement data to SoM 910 (e.g., via AFP 904) for processing by the application, and SoM 910 can process the touch events via a software driver for providing related data to the application (e.g., touch coordinates, a region associated with the touch coordinates, or other movement data).

In this or alternative examples, additional hardware tampering mechanisms can be present, as described, such as anti-tampering shell 914, mesh layered cabling, microswitches, etc. In one example, SoM 910 and secure chip 912 are encased in an anti-tampering shell 914, which can be a cap displaced over the SoM 910 and secure chip 912 such that movement or removal of the cap, tampering with the components therein, etc. can be detected and reported. For example, the anti-tampering shell 914 can have mesh layers or other mechanisms to detect removal or movement of the shell 914 or contents thereof. The anti-tampering shell 914 can be coupled to a processor (e.g., AFP 904, SoM 910, secure chip 912, etc.) or other devices, as described, to report detected tampering. The shell 914 can be composed of plastic, ceramic, or other suitable materials to prevent accessing contents thereof. In one example, the shell 914 can be or can include a Bourns cap. In addition, SoM 910 and/or secure chip 912 can be installed on a PCB with mesh layers disposed between or otherwise nearby to detect a cavity where the SoM 910 or secure chip 912 is partially or entirely removed. In any case, such detections can trigger one or more events to secure chip 912, SoM 910, AFP 904, or other components, to erase memory, decommission components, etc.

In addition, as described above, PED 908 can use a mesh layered cable for communicating data from AFP 904 (and SoM 910) to touch display 902. The cable can additionally or alternatively have microswitches to detect removal from touch display 902 and/or PED 908, as described above. Detection by the mesh layers, microswitches, etc., can trigger one or more events, as described. In addition, a battery back-up can be used to power certain portions of system 900, such as anti-tampering shell 914, one or more processors (e.g., SoM 910, AFP 904, etc.), or other tampering detection mechanisms to allow tamper detection and subsequent event processing (e.g., memory erasure, device decommissioning, etc.), in the event of power outage.

It is to be appreciated that AFP 904 can be implemented as SoM 910, in one example, coupled to secure chip 912 and able to communicate with PED 908 and/or non-secured touch controller 906, as described in various examples above. Moreover, in some examples, it is to be appreciated that non-secured touch controller 906, in the depicted configuration, can be secured, as described below.

Figure 10:
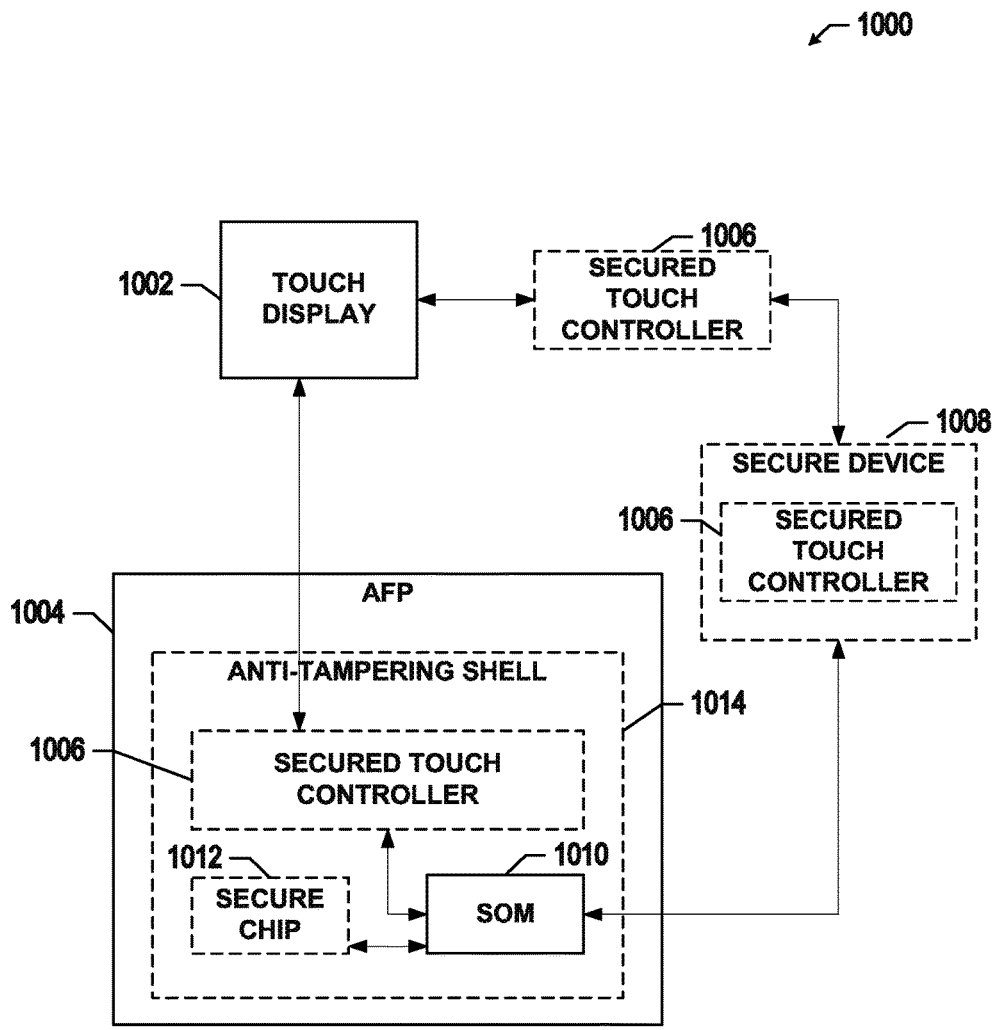
FIG. 10 is an example system for providing touchscreen input at a fuel dispenser.

FIG. 10 illustrates another example system 1000 for employing in a fuel dispenser to allow touchscreen input. System 1000 implements full touchscreen functionality also allowing for entry of a PIN or other sensitive data via the touch display 1002. In this configuration, a PIN pad, such as PED 908, may not be present, or may be utilized for other purposes. Moreover, in this configuration, additional physical or virtual security of various components can be used to mitigate tampering with the sensitive data. Touch display 1002 can be utilized by an AFP 1004 directly, via a secured touch controller 1006, and/or via an optional secure device 1008 that can include the secured touch controller 1006. In this regard, multiple configurations for the secured touch controller 1006 are possible, as depicted and described further herein.

Touch display 1002 can be similar to touch display 902, AFP 1004 can be similar to AFP 904, and secured touch controller 1006 can be similar to non-secured touch controller 906 but is secured by one or more physical (anti-tampering) or virtual security measures. AFP 1004 optionally includes a secure chip 1012 that is configured to provide SoM 1010 with secrets, encryption keys, or other security information for establishing a secure channel with optional secure device 1008 (similarly to secure chip 912). In this example, SoM 1010 can authenticate applications executing on AFP 1004 based on verifying a signature thereof, as described, and can accordingly manage access to touch display 1002 based on the signature. Moreover, an anti-tampering shell 1014, similar to anti-tampering shell 914, can encase the SoM 1010, optional secure chip 1012, and/or secured touch controller 1006 to provide the secure anti-tampering module. In addition, for example, the AFP 1004 can be installed on a hub interface PCB (HIP), which can include two AFPs (e.g., one on each side) for a dual sided fuel dispenser.

Secured touch controller 1006, as depicted in this example, can be installed on the AFP 1004 under the anti-tampering shell 1014, or outside of the AFP 1004, in which case secured touch controller 1006 can be within a secure device 1008 or otherwise secured. In one example, secured touch controller 1006 can be secured outside of secure device 1008 (with secure device 1008 absent or present in the installation), as described, by implementation of the secured touch controller 1006 on an independent PCB. For example, such a PCB can include one or more security mechanisms (e.g., mesh layers, microswitches, etc.) associated with PCB and/or related cabling to touch display 1002, AFP 1004, secure device 1008, SoM 1010, or other components, to prevent tampering with the secured touch controller 1006. As described, secure device 1008, where present, can include components similar to a PIN pad 212 for providing a secure environment for secured touch controller 1006, for processing payment transactions, etc. In one example, secured touch controller 1006 can be affixed to the touch display via a port thereon (which can be an anti-tampering port as described) to mitigate the need for a cable to interface between the secured touch controller 1006 and touch display 1002.

In another installation, optional secure device 1008 can include the secured touch controller 1006. In this example, secured touch controller 1006 can be a "dumb" controller, as described with respect to display controller 322, that is within a secure environment of secure device 1008. Secure device 1008 can include components similar to PED 908 used to provide the secure anti-tampering environment (e.g., a secure controller 206), while other components (e.g., keys of a PIN pad) can be absent from secure device 1008 or used for other purposes. In one example, where the secure device 1008 excludes keys or other external interface functions, secure device 1008 can be installed within a fuel dispenser 200 without having to be installed on an external face thereof. It is to be appreciated that optional secure device 1008 can be present and not include secured touch controller 1006 as well, in one example (e.g., the secured touch controller 1006 can be on an independent PCB or AFP 1004 and providing access from secure device 1008 to touch display 1002).

In yet another installation, secured touch controller 1006 can be installed under the anti-tampering shell 1014 of the AFP 1004. In an example, the secured touch controller 1006 is still connected to touch display, and the associated cabling can run underneath or through the anti-tampering shell 1014. The foregoing installations provide a secure anti-tampering environment for the secured touch controller 1006 to prevent tampering therewith. Additional security measures can be provided by a driver that operates and/or limits display functionality of the touch display 1002, as described previously. The driver can be implemented by the secure device 1008 when present (e.g., in the security controller 206), in the SoM 1010, etc., depending on the installation.

According to an example, when the virtual PED is not activated on touch display 1002 for receiving a PIN or other confidential information, the touch display 1002 can be limited (e.g., to a number of touch regions, preventing an application from generating a PIN pad in an attempt to acquire confidential information). To effectuate such measures, optional secure device 1008, where present, can operate a driver to accordingly control the display 1002 as described above with respect to secure controller 206. For example, secure device 1008 can normally operate touch display 1002 in the limited mode (e.g., with 8 touch regions to prevent providing a 10 digit PIN pad). When PIN entry is requested, secure device 1008 can activate the virtual PED on touch display 1002, and/or accordingly prevent other requests to the touch display 1002 until the virtual PED is no longer displayed (e.g., until PIN entry is complete, until an OK or Cancel region is pressed, until a period of time has expired, etc.). In one example, secure device 1008 can deactivate a connector to which a cable from AFP 1004 (or SoM 1010) is coupled to prevent applications executing on AFP 1004 (or SoM 1010) from accessing the display until the PIN or other confidential information is retrieved.

PIN entry can be requested by one or more applications operating on AFP 1004, and SoM 1010 can ensure the applications are signed by an appropriate entity before granting access thereto. As described, for example, SoM 1010 can establish a secure channel with secure device 1008 (e.g., similarly as SoM 910 to PED 908), and thus can request rendering of the virtual PED over a secure channel with secure device 1008 on behalf of a signed application. Secure device 1008 can authorize the virtual PED. Where secure device 1008 is not present, SoM 1010 can provide functionality of the secure device 1008 to securely operate touch display 1002, as described further herein. In one example, secure device 1008 can additionally manage transaction payment, as described with respect to PIN pad 212 and/or related controller 206 above, and can thus activate the virtual PED to retrieve a PIN for processing transaction data at a related fuel dispenser, in one example.

In the above examples, where secured touch controller 1006 is inside of secure device 1008, inputs to the virtual PED rendered by touch display 1002 and received at the secured touch controller 1006 are processed by secure device 1008 as well. Where secured touch controller 1006 is outside of secure device 1008, however, inputs from the touch display 1002 can be encrypted by secured touch controller 1006 for providing to secure device 1008 and/or to SoM 1010 to facilitate additional security for the input of confidential information on the virtual PED. This can be performed using secrets, encryption keys, or other security information held by and/or preconfigured to touch display 1002 and the component operating the driver for secured touch controller 1006 (e.g., secure device 1008), as similarly described above with respect to establishing the secure channel between a SoM and a PED.

Where secure device 1008 is not present, AFP 1004 can include the secured touch controller 1006 under the anti-tampering shell 1014, and coupled to touch display 1002 and/or SoM 1010. SoM 1010 can be, or can provide, the secure controller for securing the secured touch controller 1006 by implementing functionality described above with respect to secure device 1008, in one example. Thus, for instance, SoM 1010 can implement the driver to operate and secure the display functionality of the touch display 1002, as described above with respect to PED 908 and/or associated secure controller 206. For example, SoM 1010 can operate the touch display 1002 in a limited mode where not used for PIN entry. When an application requests rendering of the virtual PED on touch display 1002 for PIN entry, for example, SoM 1010 can accordingly prevent other applications from accessing touch display 1002 until desired input is received or until the virtual PED is no longer active on touch display 1002. In addition, for example, SoM 1010 can first verify the application is signed before rendering or otherwise allowing access to the virtual PED.

In addition, where secure device 1008 is not present, SoM 1010 can operate the driver to process inputs received via secured touch controller 1006, as described above with respect to SoM 910 and non-secured touch controller 906. Thus, SoM 1010 can receive commands from touch display 1002 via secured touch controller 1006, and can process the commands for providing related information to one or more applications accessing the touch display 1002. Furthermore, where secure device 1008 is not present and the secured touch controller 1006 communicates directly with SoM 1010, SoM 1010 can ensure that other applications are not able to access the touch input data received from secured touch controller 1006. In addition, where secure device 1008 is not present, secure chip 1012 may not be needed as the SoM 1010 implements the secure controller functionality.

Furthermore, in this example, anti-tampering shell 1014 encases the secured touch controller 1006 as well to mitigate tampering with the controller 1006 and/or any cables coupling the controller 1006 to the touch display 1002. As described, anti-tampering shell 1014 can include mesh layers to detect movement, removal, or other tampering with the shell 1014 or components disposed therein. In addition, a secure cable can be used to couple secured touch controller 1006 (e.g., under the anti-tampering shell 1014) with touch display 1002. The secure cable can be similar to the flexible circuit assembly 602 discussed previously, in one example. Also, for example, touch display 1002 can utilize one or more microswitches, as discussed, to detect movement or removal thereof.

It is to be appreciated that AFP 1004 can be implemented as SoM 1010, in one example, coupled to secure chip 1012 and encased in the anti-tampering shell 1014 with secured touch controller 1006.

Figure 11:
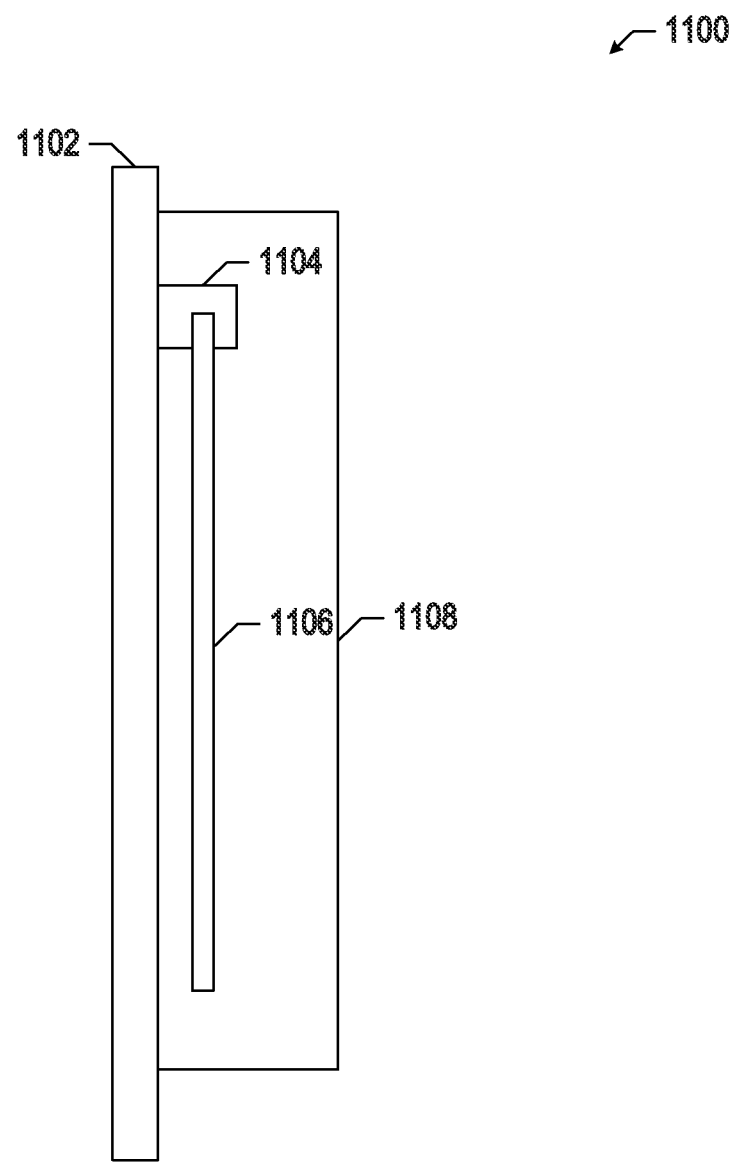
FIG. 11 is a diagrammatic side elevation view of a feature processor and system on module (SoM) configuration in accordance with aspects described herein.

FIG. 11 illustrates a diagrammatic side elevation view of an example AFP and SoM configuration 1100 for deploying in a fuel dispenser. An AFP 1102 is shown that includes a slot, socket, or similar interface 1104 for receiving a SoM 1106. The SoM 1106 can be a PCB that can be coupled to the slot 1104 via a connector or circuit assembly. For example, the SoM 1106 can include a plurality of terminal contacts that are received by slot 1104 to provide electronic communications between the AFP 1102 and SoM 1106. As depicted, horizontal mounting of the SoM 1106 on a slot 1104 displaced vertically or perpendicularly relative to the AFP 1102 provides a low profile configuration.

In addition, in this regard, an anti-tampering shell 1108 can be installed on the AFP 1102, encasing the SoM 1106, to prevent or otherwise detect tampering with the SoM 1106. For instance, the anti-tampering shell 1108 can include a mesh layer or other tampering detection mechanism (e.g., one or more switches) disposed between it and the AFP 1102 such that movement, removal, etc. detected on the anti-tampering shell 1108 can trigger an event to AFP 1102, SoM 1106, or a related processor to erase memory, decommission one or more components, etc., as described above. Moreover, though not depicted, the AFP 1102 can additionally include a secure chip or secured touch controller installed within the anti-tampering shell 1108.

Figure 12:
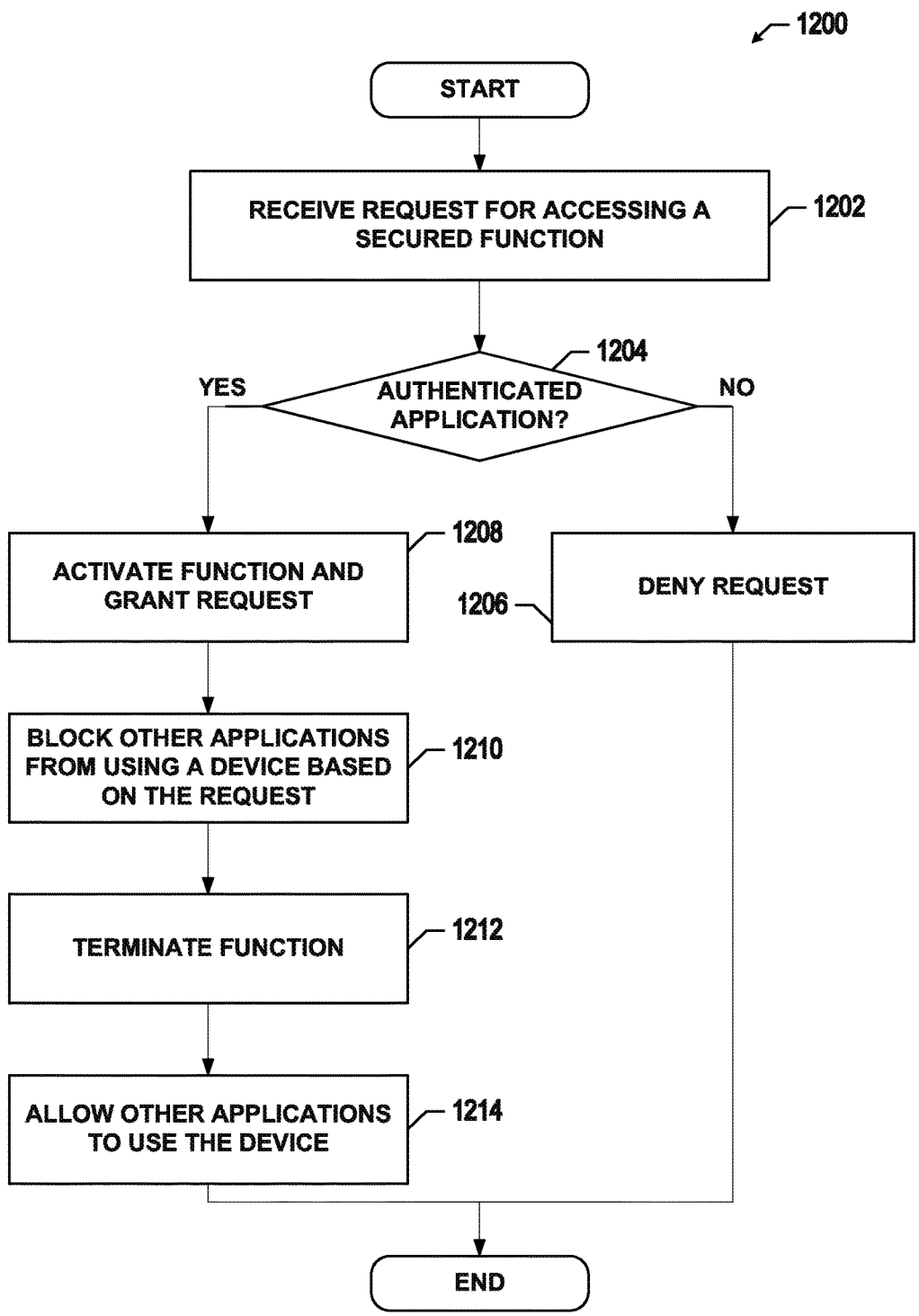
FIG. 12 is an example methodology processing a request for accessing a secured input function.

Referring to FIG. 12, a methodology that can be utilized in accordance with various aspects described herein is illustrated. While, for purposes of simplicity of explanation, the methodology is shown and described as a series of acts, it is to be understood and appreciated that the methodology is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 12 illustrates an example methodology 1200 for processing a request to access a secured function. At 1202, a request for accessing a secured function is received. The request can be received from an application operating on a feature processor, as described. The secured function can relate to accessing a physical PED, accessing an input portion of a touchscreen display, accessing an available function of such (e.g., a routine to present a virtual PED on the touchscreen, and receive information thereon), and/or the like. Moreover, it is to be appreciated that the request can be to present secure output or output in an attempt to solicit secure input as well.

At 1204, it can be determined whether the application requesting the access is authenticated. This can include verifying whether the application, request, etc. is signed, and/or whether the signature correlates to an accepted source (e.g., a manufacturer of a fuel dispenser, a retail site operator, etc.). If the application is not authenticated, the request for the function can be denied at 1206.

If the application is authenticated, at 1208, the function is activated and the request is granted. Activating the function can include communicating over a secure channel with a secure controller to access the secured function. For example, this can include activating a PED, touch display or a portion thereof, etc. over the secure channel (e.g., established using stored secrets, encryption information, etc.). In addition, activating the function and granting the request at 1208 can also include ensuring another application is not using the requested function. Moreover, while verifying authentication at 1204 can be performed by a SoM, as described in one example, activating the function at 1208 is requested by the SoM from a secure controller, which can be a hardware controller at a PED, a software driver operated by SoM, etc., as described.

At 1210, other applications can be blocked from using a device based on the request (e.g., applications that are not authenticated or any applications). This can include filtering commands from the other applications related to the device, which can include filtering commands related to an output or other function of the device as well in one example. In an example, the secured function can correlate to an input function of a touch display where the device is the display, and thus the display is secured to prevent other applications from accessing while the secured function is activated. In another example, the secured function can correlate to a PIN pad, as described, where the device is a display, at least a portion of which is blocked from other applications while the PIN pad is active. Blocking at 1210 can occur on the SoM (e.g., where the other applications are not authenticated), and/or at the PED (e.g., where the other applications are not associated with the application using the secured function).

At 1212, the function can terminate. This can relate to an indication that input has been received or the function is no longer needed (e.g., pressing an "OK" or "Cancel" button), a number of input actions performed, a lapse of time, or other indication. Once the function terminates, other applications are allowed to use the device 1214. This can include using the device for other purposes, such as output or other input functions, and/or for the function requested at 1202 if allowed.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A user interface for a retail device comprising:
at least one payment device configured to receive payment data associated with a payment card;
a first controller operatively connected to the at least one payment device and configured to receive the payment data associated with the payment card from the at least one payment device and to encrypt the payment data to create encrypted payment data;
a second controller separate from said first controller but operatively connected to the first controller, said second controller configured to receive the encrypted payment data from the first controller;
a housing, wherein the first controller is affixed to the housing;
at least one sensor connected to the first controller and the housing, the at least one sensor being configured to detect separation of the first controller from the housing, wherein activation of the at least one sensor causes the user interface to become inoperable; and
a display for the retail device operatively connected to the second controller, wherein the second controller is configured to manage operation of the display,
wherein the first controller is operatively connected to all payment devices of the user interface configured to receive payment data and is configured to handle all payment data, and wherein the second controller does not handle any sensitive payment data in an unencrypted format.

2. The user interface of claim 1, wherein the first controller determines whether to place the user interface in a secure state based upon receipt of any payment data and whether to provide instructions to the second controller regarding the operation of the display based at least in part on the determination to place the user interface in the secure state.

3. The user interface of claim 1, further comprising at least one sensor operatively connected to the first and second controllers configured to detect separation of the first controller from the second controller, wherein activation of the at least one sensor causes the user interface to become inoperable.

4. The user interface of claim 1, wherein the first controller encrypts a first portion of the payment data according to a host encryption scheme for a host processing system configured to process transactions involving the payment card.

5. The user interface of claim 1, wherein the first controller encrypts a second portion of the payment data according to a local encryption scheme.

6. The user interface of claim 1, wherein the at least one payment device comprises a card reader.

7. The user interface of claim 6, wherein the card reader is a magnetic stripe card reader.

* * * * *